United States Patent
Maruyama et al.

(10) Patent No.: US 8,365,226 B2
(45) Date of Patent: Jan. 29, 2013

(54) INFORMATION PROVIDING APPARATUS, BROADCAST RECEIVING TERMINAL, INFORMATION PROVIDING SYSTEM, INFORMATION PROVIDING METHOD, AND PROGRAM

(75) Inventors: Tetsuo Maruyama, Tokyo (JP); Tetsu Sumita, Tokyo (JP); Kaori Wada, Tokyo (JP)

(73) Assignees: Sony Corporation (JP); Plat-Ease Corporation (JP)

( * ) Notice: Subject to any disclaimer, the term of this patent is extended or adjusted under 35 U.S.C. 154(b) by 450 days.

(21) Appl. No.: 12/381,558

(22) Filed: Mar. 13, 2009

(65) Prior Publication Data

US 2009/0235313 A1    Sep. 17, 2009

(30) Foreign Application Priority Data

Mar. 14, 2008   (JP) .................... P2008-066872

(51) Int. Cl.
   *H04N 13/00* (2006.01)
(52) U.S. Cl. ........................................... 725/46
(58) Field of Classification Search ................ 725/9–12, 725/34, 35, 39, 44–46
   See application file for complete search history.

(56) References Cited

U.S. PATENT DOCUMENTS

| | | | | |
|---|---|---|---|---|
| 7,721,310 | B2 * | 5/2010 | Schaffer et al. ................ | 725/46 |
| 2002/0083451 | A1 * | 6/2002 | Gill et al. ........................ | 725/46 |
| 2003/0145326 | A1 * | 7/2003 | Gutta et al. ..................... | 725/46 |
| 2005/0022236 | A1 * | 1/2005 | Ito et al. ......................... | 725/39 |
| 2005/0160458 | A1 * | 7/2005 | Baumgartner .................. | 725/46 |
| 2009/0110246 | A1 * | 4/2009 | Olsson et al. .................. | 382/118 |

FOREIGN PATENT DOCUMENTS

| | | |
|---|---|---|
| JP | 2000-155764 A | 6/2000 |
| JP | 2000-201303 A | 7/2000 |
| JP | 2005-210155 A | 8/2005 |
| JP | 2006011896 A | 1/2006 |
| JP | 2008204193 A | 9/2008 |

OTHER PUBLICATIONS

Office Action from Japanese Application No. 2008-066872, dated Oct. 2, 2012.

* cited by examiner

*Primary Examiner* — Vivek Srivastava
*Assistant Examiner* — Aklil Tesfaye
(74) *Attorney, Agent, or Firm* — Lerner, David, Littenberg, Krumholz & Mentlik, LLP

(57) ABSTRACT

There is provided an information providing apparatus that can be connected to a broadcast receiving terminal that displays electronic contents guide (ECG) information including attribute information expressing contents of a program, including an ECG information storage part that stores ECG information, a viewer EID processing part that processes viewer emotional identification (EID) information as emotional information expressing a program preference of a viewer, a program EID processing part that creates a program EID as emotional information corresponding to contents of the program; an ECG unit constitution part that constitutes an ECG unit by correlating the ECG information with the program based on the attribute information and correlates the program EID with the ECG unit, an EID conformity determination part that determines the ECG unit provided to the broadcast receiving terminal and an ECG unit providing part that provides the determined ECG unit to the broadcast receiving terminal.

17 Claims, 11 Drawing Sheets

LEVEL OF EMOTION
WEAK ⟵——————⟶ STRONG

| a | EMOTIONAL ELEMENT | 1 | 2 | 3 | 4 | 5 |
|---|---|---|---|---|---|---|
| 1 | BRILLIANT | 1 | 0 | 0 | 0 | 0 |
| 2 | BEAUTIFUL | 0 | 0 | 0 | 0 | 1 |
| 3 | LUXURIOUS | 1 | 0 | 0 | 0 | 0 |
| 4 | ARTISTIC | 0 | 0 | 1 | 0 | 0 |

LEVEL OF EMOTION
WEAK ⟵——————⟶ STRONG

| b | EMOTIONAL ELEMENT | 1 | 2 | 3 | 4 | 5 |
|---|---|---|---|---|---|---|
| 1 | LOVELY | 1 | 0 | 0 | 0 | 0 |
| 2 | COOL | 1 | 0 | 0 | 0 | 0 |
| 3 | CUTE | 0 | 0 | 1 | 0 | 0 |
| 4 | SEXY | 0 | 0 | 1 | 0 | 0 |

INFORMATION PROVIDING APPARATUS, BROADCAST RECEIVING TERMINAL, INFORMATION PROVIDING SYSTEM, INFORMATION PROVIDING METHOD, AND PROGRAM

CROSS-REFERENCE TO RELATED APPLICATION

The present application claims priority from Japanese Patent Application No. JP 2008-066872, filed in the Japanese Patent Office on Mar. 14, 2008, the entire content of which is incorporated herein by reference.

BACKGROUND OF THE INVENTION

1. Field of the Invention

The present invention relates to an information providing apparatus, a broadcast receiving terminal, an information providing system, an information providing method, and a program.

2. Description of the Related Art

In recent years, by an increase of the number of channels accompanied by spread of a digital broadcast and a cable television, program information is provided utilizing Electronic Program Guide (EPG) information. Based on the EPG information, a viewer can find a desired program out of a plurality of programs. By registering preference information such as a favorite category and character, the viewer can also reduce a load of searching a program. However, a program supposed to be desired by the viewer is sometimes broadcasted by a channel other than the channel determined based on the registered preference information.

Therefore, various kinds of techniques are provided, to reduce the load of the viewer in selecting the program and prevent a case such as missing the desired program by the viewer. For example, in order to improve convenience, there is proposed a method of judging a program preference of the viewer based on a viewing history of the program and an acquisition history of program information, and recommending contents to the viewer by utilizing such a judgment result.

For example, Japanese Patent Application Laid-Open No. 2000-155764 discloses a technique of specifying a viewer's preference tendency to any one of a plurality of preference patterns based on a program selection history of the viewer, and searching the program matched with the preference of the viewer. Also, Japanese Patent Application Laid-Open No. 2000-201303 discloses a technique of reducing the load of the user in selecting the program by judging the preference of a user based on a history of acquiring the past each kind of information, and selecting the program information based on this judgment result.

SUMMARY OF THE INVENTION

In a system in related art, the program preference of the viewer is specified, with a specific category, character, and channel set as parameters based on the viewing history of the viewer, and based on such a program preference, the program information, etc, is provided. However, the program information supposed to be desired by the viewer is not limited to such a specific category, character, and channel, etc. For example, it is desirable that the program information desired by the viewer satisfies an emotion of the viewer in viewing the program. This is because the viewer generally selects the program, etc, based on the program preference including a plurality of emotional elements. For example, in a case of viewing a certain action movie, the viewer selects this action movie based on a plurality of emotional elements such as a heart-quickening emotion like feeling excited, and entertaining emotion like feeling cheerful. In this case, as a program capable of satisfying the emotional elements of the viewer, the category is not limited to the action movie, and for example, various programs such as a sport program and a quiz program can be considered.

However, in the system in related art in which the program information, etc, is provided based on the program preference, with a specific category and character set as parameters, the program information capable of satisfying the emotion of the viewer can hardly be appropriately provided. As a result, the viewer sometimes misses the program capable of satisfying the emotion conceived by the viewer in viewing the program.

Therefore, the present invention has been made in view of the above-described issues, and it is desirable to provide new and improved information providing apparatus, broadcast receiving terminal, information providing system, information providing method, and program, capable of providing appropriate information corresponding to the program preference based on the emotion of the viewer.

According to an embodiment of the present invention, there is provided an information providing apparatus, which can be connected via a communication network to a broadcast receiving terminal that displays electronic contents guide (ECG) information including attribute information expressing contents of a program, comprising an ECG information storage part that stores the ECG information, a viewer EID processing part that processes viewer emotional identification (EID) information as emotional information expressing a program preference of a viewer of the broadcast receiving terminal, a program EID processing part that processes program EID as emotional information corresponding to the contents of the program, an ECG unit constitution part that constitutes an ECG unit by correlating at least one of the ECG information with the program expressed by the attribute information, and correlates the program EID corresponding to this program with the ECG unit, an EID conformity determination part that determines one or more ECG units provided to the broadcast receiving terminal, based on the program EID correlated with the ECG unit and the viewer EID and an ECG unit providing part that provides the determined one or more ECG units to the broadcast receiving terminal via the communication network.

With this structure, the information providing apparatus can constitute the ECG unit including the ECG information and the program EID. The information providing apparatus can further determine one or more ECG units provided to the broadcast receiving terminal, based on the program EID constituting the ECG unit and the viewer EID, being the emotional information expressing the program preference of the viewer. The information providing apparatus can further provide the determined one or more ECG units to the broadcast receiving terminal via the communication network.

According to another embodiment of the present invention described above, there is provided a broadcast receiving terminal, which can be connected via a communication network to an information providing apparatus constituting an ECG unit including at least one piece of electronic contents guide (ECG) information correlated to a program, and a program EID (emotional identification) as emotional information corresponding to contents of the program, comprising a viewing log processing part that processes a viewing log including a viewing record stored in the broadcast receiving terminal, for creating viewer emotional identification (EID) information as emotional information expressing a program preference of a viewer, an ECG unit acquisition part that acquires from the information providing apparatus, the ECG unit including the program EID that conforms to the viewing EID, out of one or more aforementioned ECG units constituted by the information providing apparatus, via the communication network; and a display controlling part that controls display of the ECG unit.

With this structure, in order to create the viewer EID being the emotional information expressing the program preference of the viewer, the broadcast receiving terminal can process the viewing log including the viewing record stored in the broadcast receiving terminal. The broadcast receiving terminal can further acquire the ECG unit that conforms to the viewer EID, from the information providing apparatus via the communication network. The broadcast receiving terminal can further control the display of the acquired ECG unit.

According to another embodiment of the present invention described above, there is provided an information providing system, including an information providing apparatus that provides electronic contents guide (ECG) information regarding a program, and a broadcast receiving terminal that can be connected to the information providing apparatus via a communication network, so that picture information and the ECG information of the program are acquired and displayed, the information providing apparatus comprising, an ECG information storage part that stores the ECG information including attribute information expressing contents of the program, a viewer EID processing part that processes viewer emotional identification (EID) information as emotional information expressing a program preference of a viewer of the broadcast receiving terminal, a program EID processing part that creates a program EID as emotional information corresponding to the contents of the program, an ECG unit constitution part that constitutes an ECG unit by correlating at least one of the ECG information with the program based on the attribute information, and correlates the program EID regarding the program to the ECT unit, an EID conformity determination part that determines one or more ECG units provided to the broadcast receiving terminal, based on the program EID correlated to the ECG unit and the viewer EID, and an ECG unit providing part that provides the determined one or more ECG units to the broadcast receiving terminal via the communication network, and the broadcast receiving terminal including a viewing log processing part that processes a viewing log including a viewing record stored in the broadcast receiving terminal, for creating the viewer EID, an ECG unit acquisition part that acquires the ECG unit from the information providing apparatus via the communication network and a display controlling part that controls a display of the ECG unit.

According to another embodiment of the present invention described above, there is provided An information providing method, for providing information via a communication network, to a broadcast receiving terminal that displays electronic contents guide (ECG) information including attribute information expressing contents of a program, comprising the steps of storing ECG information, processing viewer emotional identification (EID) information as emotional information expressing a program preference of viewer of the broadcast receiving terminal, creating a program EID for processing a program EID as emotional information corresponding to contents of the program, constituting an ECG unit by correlating at least one of the ECG information to the program based on the attribute information, and correlating the program EID corresponding to the program with the ECG unit, determining EID conformity for determining one or more ECG units provided to the broadcast receiving terminal, based on the program EID correlated to the ECG unit and the viewer EID and providing the ECG unit for providing the determined one or more ECG units to the broadcast receiving terminal via the communication network.

According to another embodiment of the present invention described above, there is provided A program applied to an information providing apparatus that can be connected via a communication network, to a broadcast receiving terminal that displays an electronic contents guide (ECG) information including attribute information expressing contents of a program, for making a computer function as an ECG information storage section that stores the ECG information, a viewer EID processing section that processes viewer emotional identification (EID) information as emotional information expressing a program preference of a viewer of the broadcast receiving terminal, a program EID processing section that processes a program EID as emotional information corresponding to contents of the program, an ECG unit constituting section that constitutes an ECG unit by correlating at least one of the ECG information to the program based on the attribute information, and correlates the program EID corresponding to the program with the ECG unit, an EID conformity determination section that determines one or more ECG units provided to the broadcast receiving terminal, based on the program EID correlated to the ECG unit and the viewer EID and an ECG unit providing section that provides the determined one or more ECG units to the broadcast receiving terminal, via the communication network.

According to another embodiment of the present invention described above, there is provided a program applied in a broadcast receiving terminal that can be connected via a communication network, to an information providing apparatus constituting an ECG unit including at least one electronic contents guide (ECG) information correlated with a program, and a program emotional identification (EID) as emotional information corresponding to contents of the program, for making a computer function as a viewing log processing section that processes a viewing log including a viewing record stored in the broadcast receiving terminal, for creating viewer emotional identification (EID) information as emotional information expressing a program preference of a viewer, an ECG unit acquiring section that acquires the ECG unit including the program EID that conforms to the viewer EID, out of one or more ECG units constituted by the information providing apparatus, from the information providing apparatus via the communication network and a display controlling part that controls a display of the ECG unit.

According to the embodiments of the present invention described above, it is possible to provide suitable information corresponding to a program preference based on a viewer's emotion.

BRIEF DESCRIPTION OF THE DRAWINGS

FIG. 5A is an explanatory view exemplifying a value of each emotional parameter constituting the EID according to this embodiment;

FIG. 5B is an explanatory view exemplifying a value of each emotional parameter constituting the EID according to this embodiment;

DETAILED DESCRIPTION OF THE PREFERRED EMBODIMENTS

Figure 1:
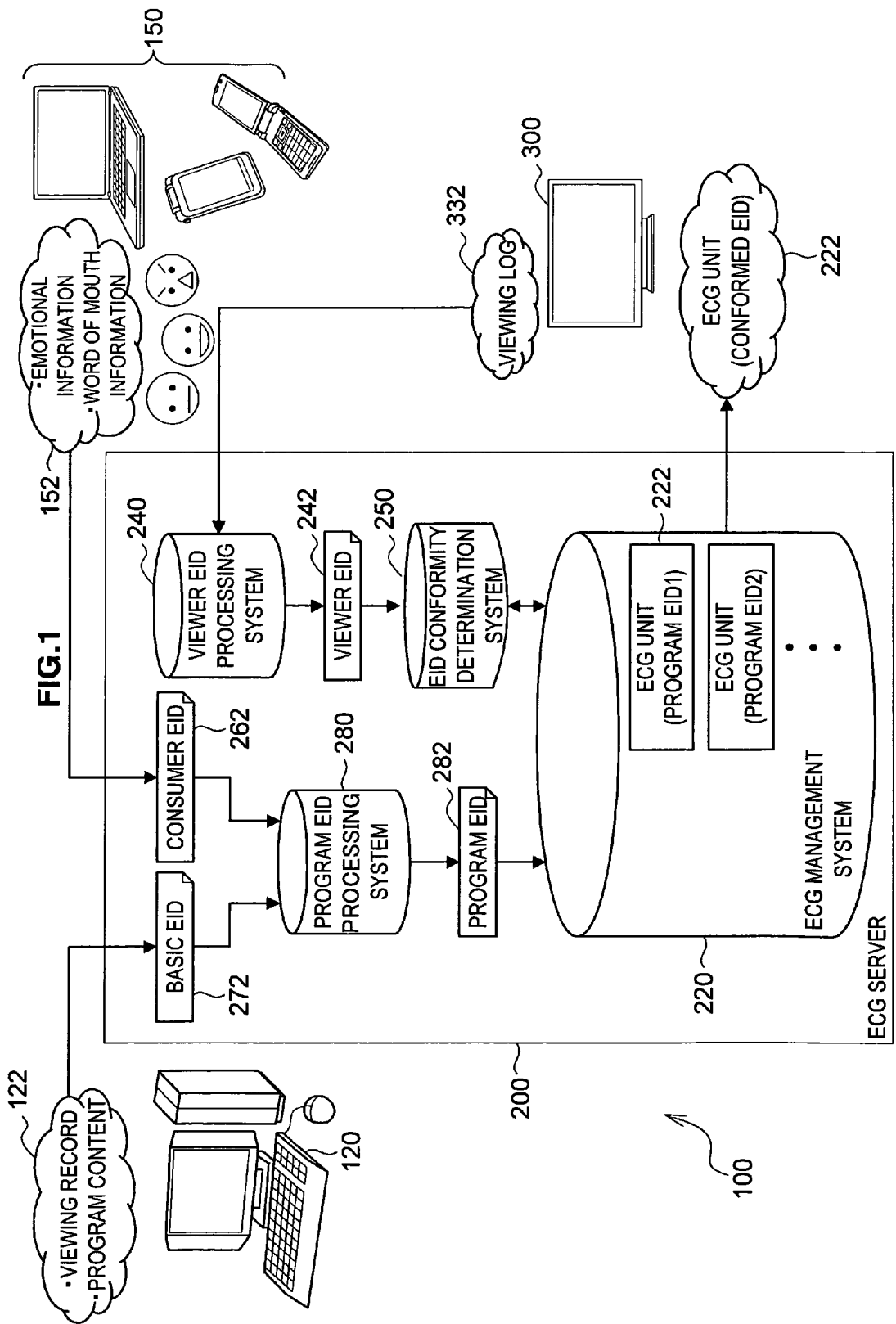
FIG. 1 is an explanatory view conceptually illustrating an entire structure of an information providing system 100 according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Entire Structure of Information Providing System 100)

FIG. 1 is an explanatory view conceptually illustrating an entire structure of an information providing system 100 according to an embodiment of the present invention. As shown in FIG. 1, the information providing system 100 mainly includes an electronic content guide information server system 200 (information providing apparatus) (called ECG server 200 hereafter), and a broadcast receiving terminal 300.

The ECG server 200 has a function of registering, managing, providing, and distributing ECG information regarding a program, and provides the ECG information regarding the program, to a broadcast receiving terminal 300 via a communication network. The broadcast receiving terminal 300 acquires and displays picture/sound information, etc, of the program via an antenna, etc, and also acquires and displays the ECG information regarding the program from the ECG server 200 via the communication network.

Here, the "ECG information" means individual information regarding a certain specific program. For example, program information provided by a content provider 130 as will be described later, and related information regarding the program provided by a sponsor 140 can be the ECG information, respectively.

The ECG server 200 acquires a viewing log 332 including a viewing history/browsing history by the viewer regarding the program stored in the broadcast receiving terminal 300. Based on the acquired viewing log 332, the ECG server 200 creates viewer emotional identification information (EID) 242 expressing a program preference based on an emotion of a viewer, by a viewer EID processing system (viewer EID processing part) 240.

Here, "EID" is identification information created based on at least one of the emotional elements, such as "cheerful" or "heart-quickening" emotion conceived by the viewer in a certain specific program.

Based on an opinion, an impression, and a word-of mouth directed to a certain specific program from a large indefinite number of viewers, the ECG server 200 creates a consumer EID262 regarding this program. Further, based on an emotional element regarding a certain specific program set by a manager (ECC service provider) 120 of the ECG server 200, the ECG server 200 creates a basic EID272. Thereafter, a program EID processing system (program EID processing part) 280 provided in the ECG server 200 creates a program EID282 regarding a certain specific program, by combining the consumer EID262 and the basic EID272 based on a predetermined condition as will be described later. Note that although details are described later, the program EID282 can also be created only by either one of them, without combining the consumer EID262 and the basic EID272.

An ECC management system (ECG management part) 220 provided in the ECG server 200 constitutes an ECG unit 222 by correlating one or more ECG information, with a certain specific program. Further, the ECC management system 220 adds (correlates) a program EID282 regarding this program, to (with) the ECG unit 222.

An EID conformity determination system (EID conformity determination part) 250 provided in the ECG server 200 retrieves at least one ECG unit 222 including the program EID282 that conforms to a viewer EID242, out of the ECG units 222 managed by the ECG management system 220. Thereafter, the ECG server 200 provides the selected ECG unit 222 to the broadcast receiving terminal 300 via the communication network.

Thus, the ECG server 200 can provide suitable content information corresponding to the program preference based on an emotion of the viewer. Further, the viewer can select the content information that conforms to the emotion conceived by the viewer in viewing the program, without being restricted by a specific category, character, and channel, etc.

Note that the "content information" in this specification includes various related information such as advertisement information and commodity information related to the program provided by the sponsor 140, in addition to program information showing the contents of the program provided by a content provider 130 as will be described later. Namely, the "content information" is the information including ECG information regarding the program information and the ECG information regarding the related information.

The information providing system 100 according to this embodiment will be described in detail hereunder.

Figure 2:
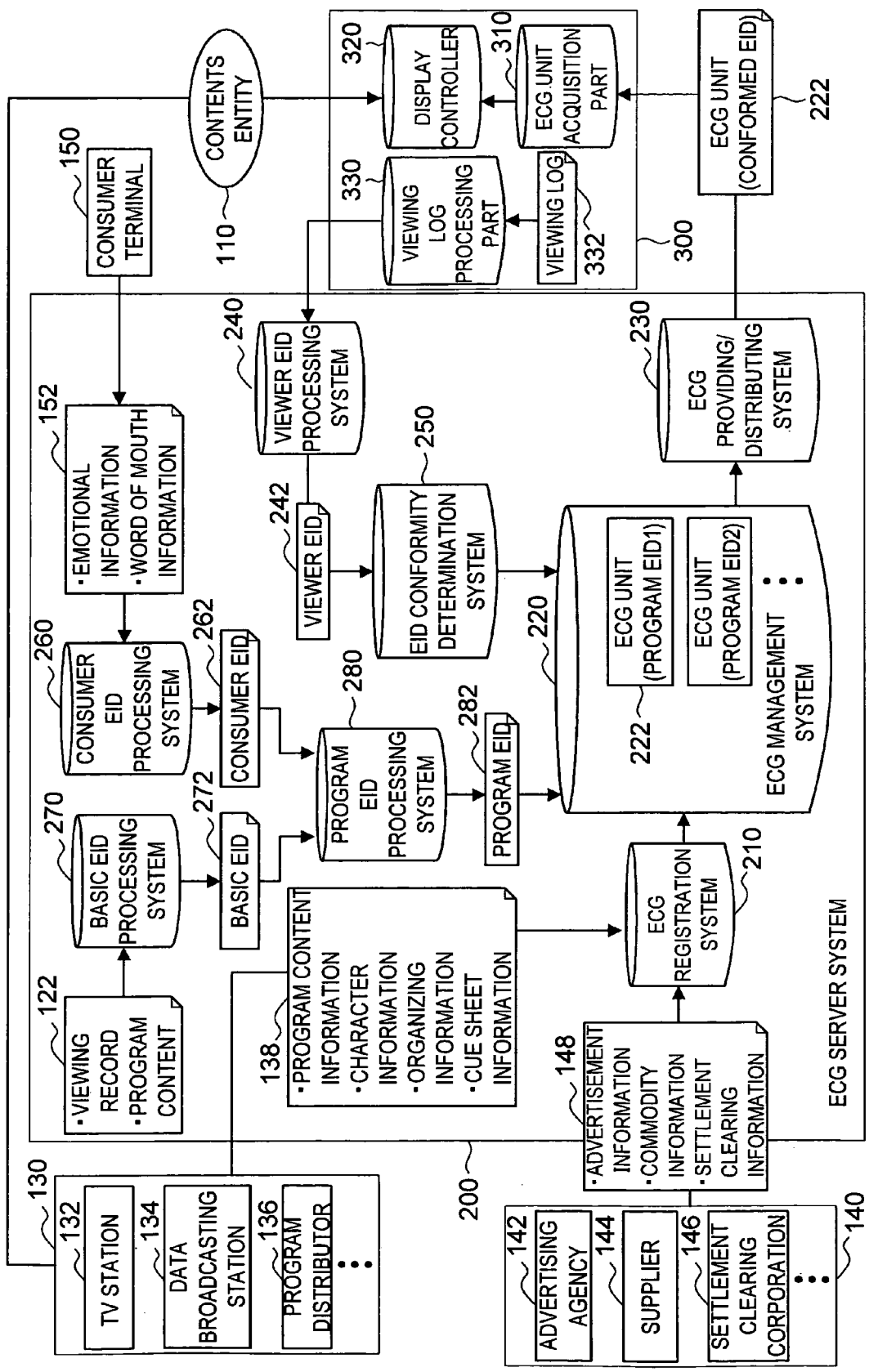
FIG. 2 is an explanatory view exemplifying a model of the entire structure of the information providing system 100 according to this embodiment.

FIG. 2 is an explanatory view exemplifying a model of an entire structure of the information providing system according to this embodiment. As shown in FIG. 2, the information providing system 100 mainly includes the ECG server 200, the broadcast receiving terminal 300, the content provider 130, the sponsor 140, and the consumer terminal 150.

The content provider 130 includes, for example, a TV station 132, a data broadcast station 134, and a program distributor 136, and so forth. The content provider 130 operates a system of managing each kind of program information 138, such as a organizing system, a material system, a right system, and an I/F system, etc. The program information 138 includes, for example, EPG (electronic program guide) information, organizing information, a Cue sheet (progress schedule in the program) information, a program format (a pattern for providing a title, CM, and a program main body, etc) information, photograph, logo information, information for program publicity, and right information, or the like. The content provider 130 provides picture/sound information of the program, data broadcast information, and EPG-SI (electronic program guide-service information), to the broadcast receiving terminal 300, and provides each kind of program information to the ECG server 200. Note that they are examples of this embodiment, and of course the content provider 130 can also include other various broadcast stations, and can also manage other various kind of program information.

The sponsor 140 includes, for example, an advertising agency 142, a supplier 144, and a settlement clearing corporation 146, etc, which provide a merchant service such as advertisement, commodity, or settlement clearing. The sponsor 140 provides each kind of content information 148 regarding the program, such as advertisement information, commodity information, and settlement clearing information, to the broadcast receiving terminal 300 via the ECG server 200. Note that they are examples of this embodiment, and of course the sponsor 140 also includes, for example, a company, etc, for providing other various information such as event information, travel information, and finance information. Further, the sponsor 140 may be a content provider 130 for providing a picture/music of the program.

A personal computer (PC), a cellular phone, a personal digital assistance (PDA), and a remote controller of a television, etc, possessed by an unspecified viewer, are given as examples of the consumer terminal 150. The consumer terminal 150 includes, for example, an operation part, a communication part, a display part, a storage part, and a control processing part, etc. Information such as an impression, an opinion, a word of mouth, and an evaluation written by an owner of the consumer terminal 150, for a specific program written on a WEB (World Wide Web) via this consumer terminal 150 is utilized for creating a consumer EID262 as will be described later. Note that in FIG. 2, although only one consumer terminal 150 is shown, the present invention is not limited to the one consumer terminal 150, and of course includes a plurality of consumer terminals 150.

(Structure of ECG Server 200)

A structure of the ECG server 200 operated by the ECG service provider 120 will be described hereunder, with reference to FIG. 2. The ECG server 200 mainly includes an ECG registration system 210, an ECG management system 220, an ECG providing/distributing system 230, a viewer EID processing system 240, an EID conformity determination system 250, a consumer EID processing system 260, a basic EID processing system 270, and a program EID processing system 280.

The ECG registration system 210 creates/registers program information such as a program, characters, a organizing schedule, a program format, and a Cue sheet provided from the content provider 130, and content information 148 such as advertisement information and commodity information provided from the sponsor 140, respectively as the ECG information. The ECG registration system 210 adds the attribute information for identifying the program, to the acquired program information and the related information, and creates/registers the ECG information. Note that the ECG registration system 210 can function as an ECG information storage part of the information providing apparatus.

The ECG management system 220 constitutes at least one piece of ECG information registered in the ECG registration system 210, as an ECG unit 222 as will be described later in correlation with the program. For example, the ECG unit 222 regarding a certain specific program includes at least one piece of ECG information having the attribute information regarding this program. The ECG management system 220 prepares a distribution schedule for distributing the ECG unit 222, in accordance with, for example, organizing information and Cue sheet information of the program. The ECG management system 220 adds the program EID282 correlated with this program, to the ECG unit 222 in cooperation with the program EID processing system 280 as will be described later. Thereafter, in order to provide one or more ECG units 222 retrieved by an EID conformity determination system 250 as will be described later, to the broadcast receiving terminal 300, the ECG management system 220 transfers the one or more ECG units 222 to an ECG providing/distributing system 230 as will be described later. Note that the ECG management system 220 can function as an ECG unit constitution part of the information providing apparatus.

The ECG providing/distributing system 230 has an ECG providing/distributing part, thereby providing/distributing one or more ECG units 222 transferred from the ECG management system 220, to the broadcast receiving terminal 300, in accordance with the aforementioned ECG distribution schedule. Note that the ECG providing/distributing system 230 can function as an ECG information providing part of the information providing apparatus.

The viewer EID processing system 240 includes a viewing log acquisition part (not shown) that acquires the viewing log 332 including the viewing history of the viewer stored in the broadcast receiving terminal 300, from the broadcast receiving terminal 300 via the communication network. Further, based on this viewing log 332, the viewer EID processing system 240 includes a viewer EID creation part (not shown) that creates a viewer EID 242 expressing the program preference of the viewer of the broadcast receiving terminal 300. Note that the viewer EID processing system 240 can function as a viewer EID processing part of the information providing apparatus.

Here, the viewer EID242 is the identification information for identifying the program preference of the viewer based on at least one emotional element, such as "cheerful" or "heart-quickening" emotion conceived by the viewer in viewing the program.

Note that in this embodiment, the viewer EID242 is created by the viewer EID processing system 240 provided in the ECG server 200. However, the present invention is not limited thereto. For example, the broadcast receiving terminal 300 can also create the viewer EID242. In this case, the viewer EID processing system 240 can include a viewer EID acquisition part (not shown) that acquires the viewer EID242 created by the broadcast receiving terminal 300.

The consumer EID processing system 260 creates the consumer EID262, based on the information such as impression, opinion, word of mouth, and evaluation from an unspecified viewer towards a certain specific program.

Here, the consumer EID262 according to this embodiment is the identification information for identifying the emotion conceived by the viewer towards the program, set based on at least one emotional element, such as "cheerful" or "heart-quickening" conceived by one or more unspecified viewer towards a certain specific program.

The consumer EID processing system 260 includes a syntax analysis part (not shown) that analyzes, for example, the information written in a message board and a blog of the Internet. The syntax analysis part can perform, for example, a CGM (Consumer Generated Media) analysis. Here, the CGM analysis is performed in such a manner that a specific retrieval keyword is set, for example, for the opinion, impression, end word of mouth written in the message board and the blog of the Internet, and writing numbers of the keywords are analyzed.

The consumer EID processing system 260 performs CGM-analysis of the information written in the message board and the blog of the Internet by using the syntax analysis part, with a program name, noun, adjective, and adjective verb expressing the emotion conceived by the viewer set as keywords. Thus, the consumer EID processing system 260 can acquire the emotional information such as the opinion and impression conceived by the viewer towards a certain specific program. Namely, the consumer EID processing system 260 can grasp what emotion is conceived by the unspecified viewer, such as "heart-quickening", "exciting", "impressive", "amazing", or "refresh" emotion, towards a certain specific program, and can acquire this information as the emotional information. Further, the consumer EID processing system 260 performs CGM-analysis based on the keywords such as "recommendable", "not-recommendable", "satisfactory", and "unsatisfactory", and thereby can acquire evaluation information of the unspecified viewer towards a certain specific program. In addition, the consumer EID processing system 260 can also function as a consumer EID processing part of the information providing apparatus.

The consumer EID processing system 260 creates the consumer EID262 based on a result of the aforementioned CGM-analysis and a consumer EID creation reference. Here, the consumer EID creation reference is a reference for creating the consumer EID262 from the result of the CGM analysis, and for example is set beforehand by the ECG service provider 120, and is managed by a consumer EID creation reference storage part (not shown) provided in the consumer EID processing system 260. Although details will be described later, the ECG service provider 120 can set, for example, the consumer EID creation reference with writing numbers of the keywords expressing the emotion conceived by the viewer towards a certain specific program set as the function.

The basic EID processing system 270 creates/manages the basic EID272 based on a basic EID creation reference set by the ECG service provider 120.

Here, the basic EID272 according to this embodiment is the identification information for identifying the emotion conceived by the viewer towards a certain specific program, created based on at least one emotional element such as "cheerful" or "heart-quickening", set by the ECG service provider 120. In addition, the basic EID creation reference is a reference for creating the basic EID272. Although details will be described later, the basic EID creation reference is set by the ECG service provider 120, and is managed by a basic EID creation reference storage part (not shown) provided in the basic EID processing system 270.

The ECG service provider 120 estimates the emotion supposed to be conceived by the viewer in viewing the program, based on various information such as the past viewing rate, channel changing record, topicality, program contents, and arbitrarily sets the basic EID creation reference. Based on this basic EID creation reference, the basic EID processing system 270 creates the basic EID272 regarding a certain specific program. Also, the basic EID processing system 270 can function as a basic EID management part of the information providing apparatus.

By combining the consumer EID262 regarding a certain specific program and the basic EID272 regarding this program under a predetermined condition, the program EID processing system 280 creates one program EID282 regarding this program.

Here, the program EID282 according to this embodiment is the identification information for identifying at least one emotion such as "cheerful" or "heart-quickening" estimated to be conceived by the viewer towards a certain specific program. In addition, the predetermined condition is the program EID creation reference set by the ECG service provider 120 for combining the basic EID272 and the consumer EID262.

Although details will be described later, this program EID creation reference is arbitrarily set/updated by the ECG service provider 120, and is managed by the program EID creation reference part (not shown) provided in the program EID processing system 280. For example, in a case of a new program or a program particularly recommended by the ECG service provider 120, the program EID creation reference with emphasis put on the basic EID272, can be set by the ECG service provider 120. Reversely, when the opinion/evaluation of a general viewer is desired to be emphasized, the program EID creation reference with emphasis put on the consumer EID262 can be set. In addition, the program EID processing system 280 can function as the program EID processing part of the information providing apparatus.

Based on this program EID creation reference, the program EID processing system 280 can create one program EID282 regarding a certain specific program.

In addition, according to this embodiment, the program EID282 is created by combining the basic EID272 and the consumer EID262. However, the present invention is not limited thereto. For example, the program EID282 can be created only from the basic EID272. In this case, the ECG service provider 120 can provide to the viewer the content information on which intentions of the content provider 130, the sponsor 140, and a specialist, etc, are reflected. Similarly, the program EID282 can be created only from the consumer EID262. In this case, the ECG service provider 120 can provide to the viewer the program information selected based on only the opinion, impression, word of mouth, and evaluation of an unspecified viewer, without considering the intentions of the content provider 130, sponsor 140, and specialist at all. Further, of course the program EID282 can also be constituted of three or more EIDs including other EID expressing the emotion regarding the program. As other EID, it may be possible to consider such cases as providing a plurality of consumer EIDs for every plural WEB sites, and providing a plurality of EIDs for every plural specialists. In this case, the ECG service provider 120 can provide the program information on which various opinions of a plurality of specialists and unspecified viewers are reflected, to the viewer.

(Structure of Broadcast Receiving Terminal 300)

The broadcast receiving terminal 300 performs communication with an external system and an external device via a communication network such as an optical fiber, ADSL (Asymmetric Digital Subscriber Line), a phone modem, a power line, and a wireless line. The broadcast receiving terminal 300 receives, for example, the program provided via each kind of transmission lines such as terrestrial analog broadcasting, terrestrial digital broadcasting, BS (Broadcast Satellite) broadcasting, 110 degrees CS broadcasting, CATV digital broadcasting, CATV analog broadcasting, and optical fiber broadcasting, via an antenna and STB (Set Top Box), etc.

The broadcast receiving terminal 300 includes a broadcast processing part, a display part, an ECG unit acquisition part 310, a display control part 320, and a viewing log processing part 330, etc. Here, the broadcast processing part has a function of receiving the picture/sound information and the data broadcast information from the content provider 130, and reproducing it in the display part as needed. The ECG unit acquisition part 310 acquires the ECG unit 222 from the ECG server 200 via the communication network. The display control part 320 displays the acquired ECG unit 222 in the display part, and according to an operation of the viewer, updates the ECG unit 222 to be displayed. The viewing log processing part 330 includes a viewing log storage part (not shown) that stores the viewing log 332 including the viewing record of the viewer in the broadcast receiving terminal 300, and a viewing log transmission part (not shown) that provides this viewing log 332 to the ECG server 200 via the communication network.

Note that according to this embodiment, the broadcast receiving terminal 300 provides the viewing log 332 to the ECG server 200, and the viewer EID processing system 240 provided in the ECG server 200 creates the viewer EID242 based on this viewing log 332. However, the present invention is not limited thereto. For example, of course the viewer EID242 can also be created in the broadcast receiving terminal 300. Namely, it is also possible that the viewing log processing part 330 includes a viewer EID creation part that creates a viewer EID242 based on the viewing log 332, and include a viewer EID transmission part that provides this created viewer EID242 to the ECG server 200.

(Structure of ECG Unit 222)

The ECG unit 222 managed in the aforementioned ECG management system 220 will be explained hereunder, with reference to FIG. 3.

Figure 3:
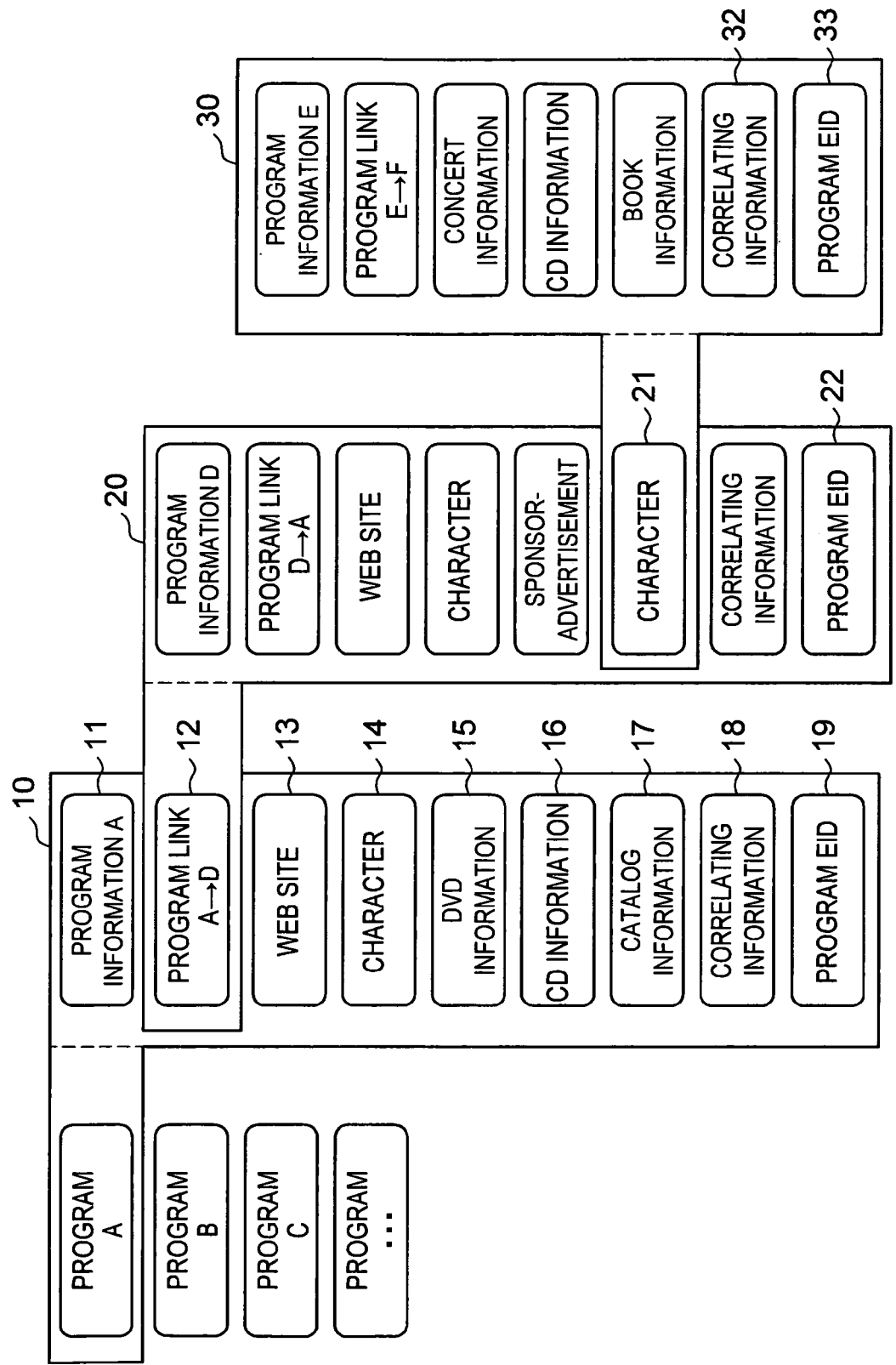
FIG. 3 is an explanatory view exemplifying a structure of an ECG unit according to this embodiment.

FIG. 3 is an explanatory view exemplifying the structure of the ECG unit. As shown in FIG. 3, the ECG unit is constituted for each program, and includes ECG information expressing the program information, ECG information expressing the related information such as WEB site and characters, and a program EID, etc. In addition, the ECG unit includes correlating information mutually correlating the program, and the program information, the related information, and the program EID. The ECG information can include, for example, the identification information capable of identifying each ECG information such as an ID number, and the attribute information for identifying the program.

Note that the ECG information expressing the program information is abbreviated as the program information, and the ECG information expressing the related information is abbreviated as the related information.

FIG. 3 illustrates ECG units 10, 20, 30 regarding programs A, D, E. For example, the ECG unit 10 regarding a program A includes the related information such as program information 11 of the program A, link information 12 to an ECG unit 20 regarding a program D, WEB site 13 regarding the program A, character information 14, DVD information 15, CD information 16, catalogue information 17, and correlating information 18. The ECG unit has a format of executable metadata, and when executed in the broadcast receiving terminal 300, each ECG information constituting the ECG unit is sequentially displayed selectively through an operation by the viewer, or through automatic processing.

As described above, program EIDs 19, 22, 33 related to each program A, D, E are added to each ECG unit 10, 20, 30, by the ECG management system 220. Namely, for example, the ECG unit 10 includes the program EID19 created based on the consumer EID262 and the basic EID272 regarding the program A.

In addition, the ECG information constituting the ECG unit is correlated between ECG units so as to be mutually referenced, based on the identification information of the ECG information and the correlating information for each ECG unit.

For example, in an example shown in FIG. 3, first, the ECG unit 10 regarding the program A is browsed in the broadcast receiving terminal 300. The ECG unit 10 regarding the program A includes the link information 12 to the program D related to the program A, and this link information 12 includes the identification information showing the ECG unit 20 regarding the program D. When this link information 12 is selected by the viewer during browsing the ECG unit 10 regarding the program A, display of the ECG unit 10 regarding the program A is interrupted, and the ECG unit 20 regarding the program D is displayed in the broadcast receiving terminal. Note that in this state, by operating a "return" button by the viewer, for example, the display of the ECG unit 10 regarding the program A is restarted.

Next, a case such as selecting the related information of a character 21 included in the ECG unit 20 regarding the program D is assumed. In this case, when the identification information of the selected related information is included in correlating information 32 of the ECG unit 30 regarding a program E, link to the related information regarding the character 21 included in the related information of the ECG unit 30 regarding the program E is possible.

Thus, the viewer can also browse other ECG unit having correlation with the ECG unit 222 provided by the ECG server 200.

Note that each ECG unit 10, 20, 30 shown in FIG. 3 is an example of this embodiment, and the present invention is not limited thereto. For example, it is also possible to include the related information other than the one shown in FIG. 3, and it is also possible to make correlation with the ECG unit regarding the program other than the programs A, D, E.

As described above, the ECG information expressing the program information and the related information utilizes the program information provided from the content provider 130, and the related information provided from the sponsor 140.

The content provider 130 tremendously accumulates the program information that can be provided as the ECG information, such as EPG information, organizing information, program format information, Cue sheet information, program basic information, program producing information, program logo/photograph, program advertising information, program sales information, and right information, etc.

However, actually the program information is created and managed by using various data formats/structures in accordance with the kind of the program information. Therefore, in order to utilize the program information as the ECG information, it is difficult to create and manage the program information by using a uniform data format/structure, and tremendous labor is required for managing the existent program information by systematically indexed and tree-structured form. Note that the advertisement information and the sales information accumulated by the sponsor 140 also have a similar issue as the program information.

Therefore, in order to utilize the program information and the related information as the ECG information, management by using a data structure as shown in FIG. 3 is proposed. In order to use such a data structure, first the program information created and managed by using various data formats/structures is collected, then indexed and tree-structured form is canceled to divide the program information into unit information. Next, the identification information is added to each unit information, and the attribute information is selectively added thereto, which is then processed into the ECG information, and by using the correlating information, this ECG information is correlated with a specific program, and is incorporated into the ECG unit. Here, when the attribute information is added, for example, the keyword included in the unit information is automatically extracted, and based on the extracted keyword, several category information can be automatically added as the attribute information.

Further, the related information is incorporated into the ECG unit as needed. In order to incorporate the related information into the ECG unit, first, a retrieval condition for retrieving the related information such as the advertisement information and the sales information regarding the program is extracted from the program information. Next, in accordance with the retrieval condition, the corresponding related information is retrieved from the existent advertisement information DB and sales information DB, and the attribute information is added to the retrieved related information and identification information, which is then processed into the ECG information, and by using the correlating information, this ECG information is correlated with the program and is incorporated into the ECG unit.

Thus, the ECG service provider 120 can efficiently arrange the existent program information and related information as the ECG unit regarding the program, with no need for systemizing them. In addition, owing to the foregoing data structure of the ECG unit, the viewer can also intuitively search other ECG unit having correlation with the ECG unit 222 provided from the ECG server 200, as needed. Therefore, the program information and the related information accumulated by the content provider 130 and the sponsor 140 can be provided to the viewer as the information having high convenience.

(Structure of EID)

Structures of the viewer EID242, the consumer EID262, and the basic EID272 created by the ECG server 200 according to this embodiment will be described hereunder, with reference to FIGS. 4 to 8.

Figure 4:
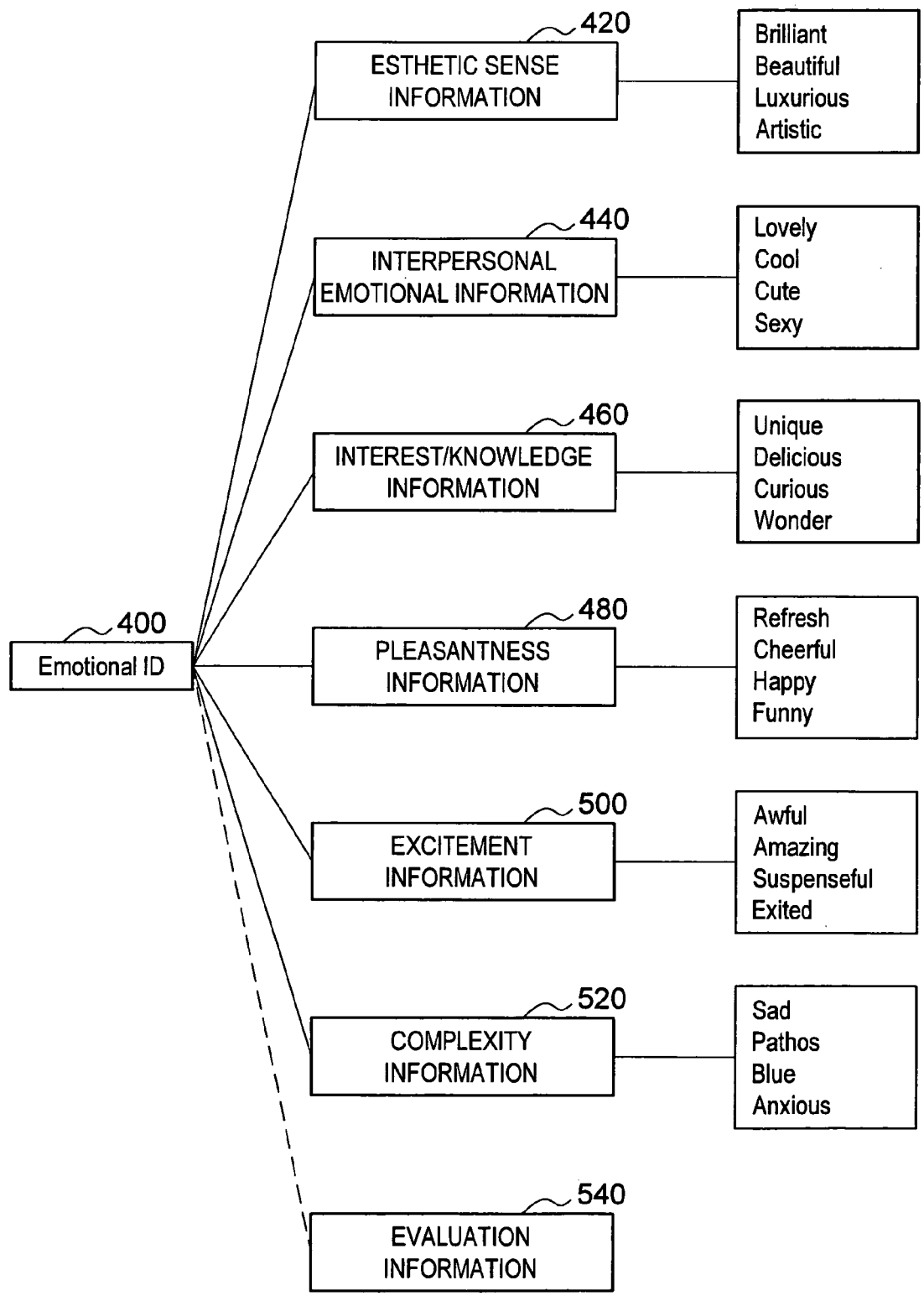
FIG. 4 is an explanatory view illustrating a concept of an emotional parameter constituting an EID according to this embodiment.

FIG. 4 is an explanatory view conceptually showing an EID400. The EID400 is formed of the emotional information conceived by the viewer towards the contents of the program. Here, the emotional information is the information expressing various emotions such as feelings, sympathy, antipathy conceived by the viewer towards the contents of the program. The emotional information is constituted of at least one emotional parameter for expressing these various emotions. For example, in the example shown in FIG. 4, the EID400 is constituted of a plurality of emotional parameters of esthetic sense information 420, interpersonal emotional information 440, interest/knowledge information 460, pleasantness information 480, excitement information 500, and complexity information 520. Further, each emotional parameter of them is constituted of one or more emotional elements. In the example shown in FIG. 4, the emotional parameter of the interpersonal emotion information 440 is constituted of four emotional elements such as "lovely", "cool", "cute", and "sexy". Also, each emotional parameter of excitement information 500 is constituted of four emotional elements such as "terrible", "astonishing", "suspenseful", and "heart-quickening". Other emotional parameter is also similarly constituted of a plurality of emotional elements.

Note that the structure of the EID400 is an example of this embodiment, and of course the EID400 can also be constituted of other emotional parameter. Similarly, of course the emotional parameter can include other emotional element. In addition, according to this embodiment, although the EID400 is constituted of each emotional parameter including a plurality of emotional elements, the EID400 can also be constituted, for example, with each individual emotional element set as the individual emotional parameter.

Generally, by viewing a certain program, the viewer conceives at least one emotional element out of the aforementioned emotional elements. For example, when viewing the program of a certain action movie, it is probable that the viewer conceives the emotional element of "cool" towards the character, and conceives the emotional element of "heart-quickening" towards the contents of the program, and conceives the emotional element of "luxurious" depending on a stage setup. Also, for example, when viewing the program of a certain suspenseful drama, it is probable that the viewer conceives the emotional element of "suspenseful", and conceives the emotional element of "curious", and conceives the emotional element of "cool" and "cute" towards the characters. Thus, the viewer conceives various emotions for each program, based on the kind of the program, the contents of the program, and the characters. Further, this is not defined uniformly per each unit of the program, and these emotional elements are changed even in the same program, for example.

For example, even in the same information program, it can be estimated that various emotions are conceived by the viewer, depending on each section. For example, in the section of introducing cooking, it is probable that the viewer conceives the emotional element of "delicious" and the emotional element of "artistic", and conceives the emotional element of "cheerful". Similarly, in a sports section, it is probable that the viewer conceives the emotional element of "cool", the emotional element of "curious", and the emotional element of "refresh". Also, in a weather broadcast section, it is probable that the viewer conceives the emotional element of "curious" and the emotional element of "cute" towards a newscaster.

In addition, in a live broadcasting of sports, when a supported team wins, it is probable that the viewer conceives the emotion such as "refresh" and "cheerful", and when a match is tense, it is probable that the viewer conceives the emotion such as "heart-quickening" and "suspenseful".

Thus, the viewer conceives various emotions towards a certain program. The EID400 according to this embodiment is constituted based on the emotional parameter including various emotional elements as described above. Namely, the EID400 expresses various emotions conceived by the viewer towards a certain specific program.

As described above, the basic EID272 is created by the basic EID processing system 270, and the consumer EID262 is created by the consumer EID processing system 260, and the viewer EID242 is created by the viewer EID processing system 240. How each of the EIDs 272, 262, 242 are created, will be described hereunder.

Regarding the basic EID272, for example, the ECG service provider 120 sets the emotional element estimated to be conceived by the viewer towards a certain program, as a basic EID creation reference. The basic EID processing system 270 creates the basic EID272 based on the set basic EID creation reference. The ECG service provider 120 can arbitrarily set/update the basic EID creation reference based on various elements such as the contents of the program, the past viewing rate, degree of promotion/advertisement, and topicality.

The consumer EID262 is created, for example, based on the information such as the opinion, impression, word of mouth, and evaluation written in the message board and the blog of the Internet by the viewer towards a certain program. As described above, by CGM-analyzing the information, for example, written in the message board and the blog of the Internet, the consumer EID processing system 260 can acquire the emotional information of a writer (viewer). For example, the consumer EID processing system 260 acquires the emotional information such as "heart-quickening", "exciting", "impressing", "amazing", "refresh" conceived by the writer towards a specific program, and creates the consumer EID262 regarding this program based on the aforementioned consumer EID creation reference.

Further, the consumer EID262 can selectively include evaluation information 540 as shown in FIG. 4 in addition to the aforementioned emotional elements. Generally, as the writing in the blog, etc, towards a certain program, there are many evaluations towards the program viewed, such as "recommendable", "not-recommendable", "extremely satisfactory", "satisfactory", "unsatisfactory", and "extremely unsatisfactory". By performing CGM-analysis to the keyword expressing the evaluation towards these programs, the consumer EID processing system 260 can acquire one or more evaluation information 540 of the viewer towards a specific program. The consumer EID processing system 262 can include this evaluation information 540 in the consumer EID262. Thus, for example the broadcast receiving terminal 300 can determine a display order to the display part, based on the evaluation information of the consumer EID262 out of the plurality of ECG units 222 acquired from the ECG sever 200. For example, the viewer of the broadcast receiving terminal 300 can select the program satisfied by many viewers, and reversely can also select the program conceived unsatisfactory by many viewers.

The viewer EID242 is created based on the viewing record of the viewer of the broadcast receiving terminal 300. The viewer EID processing system 240 according to this embodiment acquires the viewing log 332 including the viewing record of the viewer of the broadcast receiving terminal 300, and creates the viewer EID242 based on this viewing log 332. Based on the viewing log 332, the viewer EID processing system 240 analyzes a tendency of various viewing records such as the category of the viewed program, viewing time zone, a broadcast station, a program changing history, program characters, and viewing time. Thus, the viewer EID processing system 240 can recognize which emotional element is conceived by the program in which time zone and how long this program is viewed. As a result, the viewer EID processing system 240 can recognize the program preference of the viewer based on this analysis result.

In addition, the viewer EID processing system 240 creates the viewer EID242, based on the aforementioned viewer EID creation reference from the aforementioned analysis result. Although details will be described later, the ECG service provider 120 can arbitrarily create/update this viewer EID creation reference.

Generally, although the program preference of the viewer is different respectively, the viewer EID processing system 240 analyzes the program preference of each viewer, based on the viewing record of each viewer, and creates the viewer EID242 of each viewer. Thus, the ECG server 200 can provide the ECG unit 222 capable of satisfying the program preference of the viewer of each broadcast receiving terminal 300.

FIG. 5A and FIG. 5B illustrate a constitutional example of each emotional parameter constituting the EID400. As described above, each emotional parameter is constituted of at least one emotional element. In the example shown in FIG. 5A, the emotional parameter of the esthetic sense information 420 is composed of four emotional elements such as "brilliant", "beautiful", "luxurious", and "artistic". Similarly, in the example shown in FIG. 5B, the emotional parameter of the interpersonal emotion information 440 is composed of the emotional elements such as "lovely", "cool", "cute", and "sexy". Note that although FIG. 5A and FIG. 5B show only the esthetic sense information 420 and the interpersonal emotion information 440, other emotional parameter is similarly constituted. In addition, each emotional parameter and each emotional element shown in FIG. 5A and FIG. 5B is an example for describing this embodiment, and the present invention is not limited thereto. For example, of course each emotional parameter can be constituted of more emotional elements or fewer emotional elements than the example shown in FIG. 5A and FIG. 5B.

As shown in FIG. 5A and FIG. 5B, each emotional parameter is constituted based on a level (weakness and strength) of each emotional element conceived by the viewer towards the program. For example, in the example of the emotional parameter of the esthetic sense 420 shown in FIG. 5A, it is found that although the viewer hardly conceives the emotion such as "brilliant" and "luxurious", the viewer strongly conceives the emotion of "beautiful", and moderately conceives the emotion of "artistic" towards a certain program. Regarding the emotional element constituting each emotional parameter, other emotional parameter is similarly constituted based on a level of the corresponding emotional element conceived by the viewer. Note that in the example shown in FIG. 5A and FIG. 5B, the level of the emotional element is expressed by five stages, however, the present invention is not limited thereto, and of course the emotional element can also be constituted by smaller number of stages or larger number of stages.

Thus, each emotional parameter is determined based on the level of each emotional element conceived by the viewer towards a certain program, and the EID400 for this program is constituted based on the determined emotional parameter. For example, in the example shown in FIG. 5A and FIG. 5B, the emotional parameter of the esthetic sense 420 is expressed by a1513, and similarly the interpersonal emotion 440 is expressed by b1133. Other emotional parameter is also similarly constituted. Note that the kind of the emotional parameter is identified by "a" and "b", however, the present invention is not limited thereto, and of course numerals and other symbols can also be used.

Figure 6:
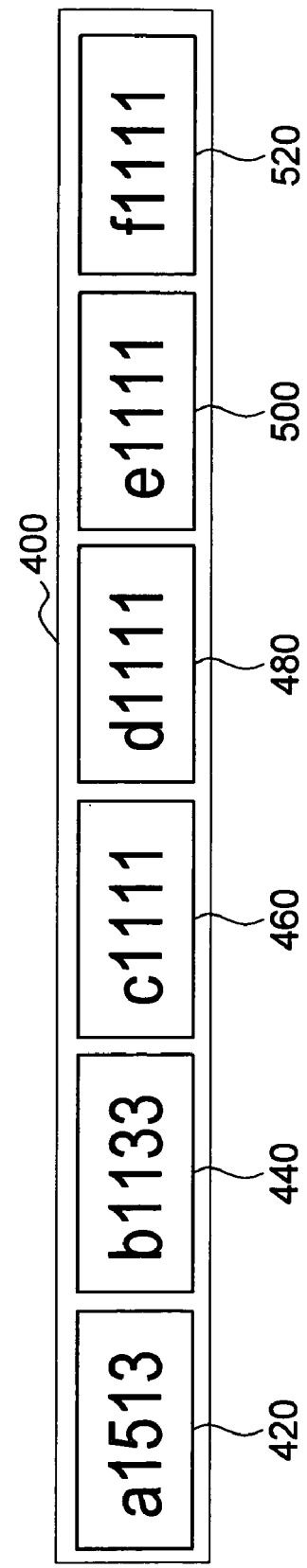
FIG. 6 is an explanatory view exemplifying the value of the EID according to this embodiment.

As a result, as shown in FIG. 6, the EID400 is expressed by, for example, "a1513b1133c1111d1111e1111f1111".

Figure 7:
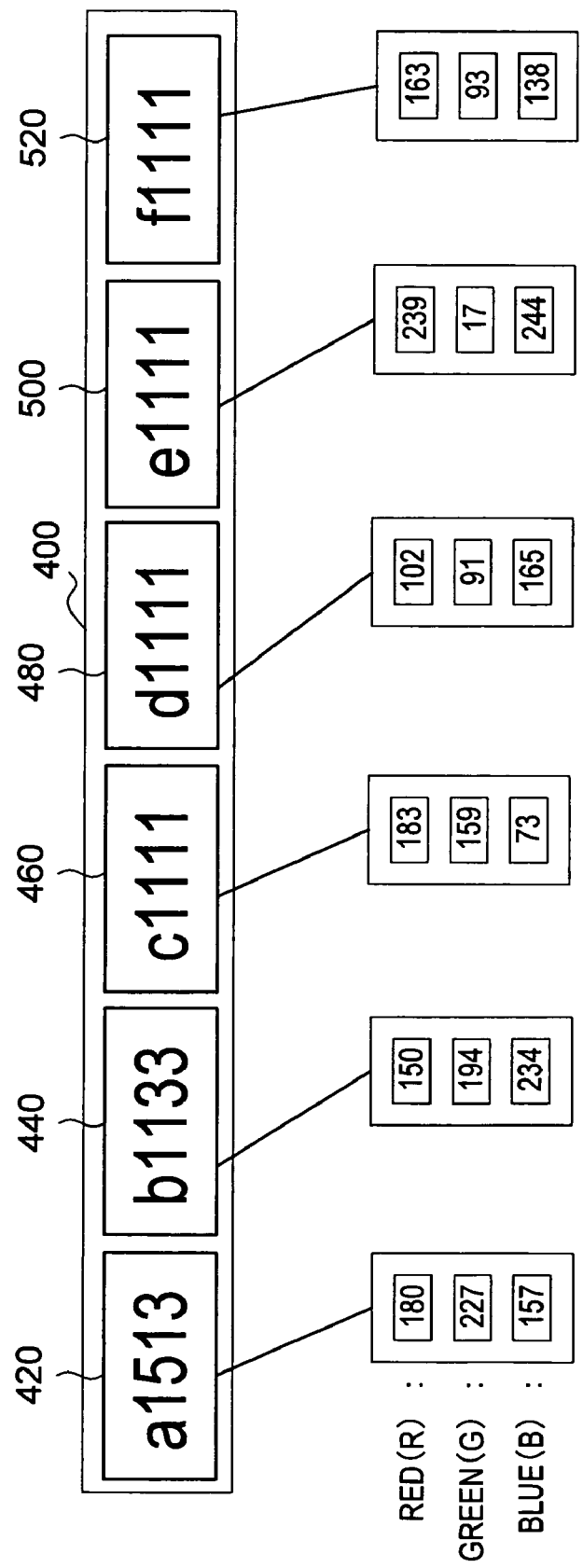
FIG. 7 is an explanatory view illustrating an example of managing each emotional parameter constituting the EID according to this embodiment, by utilizing color information.

FIG. 7 illustrates another constitutional example of the EID400. As shown in FIG. 7, each emotional parameter constituting the EID400 has color information. This is realized, for example, by previously registering the color information corresponding to each emotional element, for example, in each EID processing part 240, 260, 270, 280, as a template by the ECG service provider 120. Each emotional parameter has one piece of color information obtained by combining the color information corresponding to each emotional element. The color information can be expressed, for example, by values of brightness/luminance of each one of the three primary colors of red (R), green (G), and blue (B). The color information can also be expressed, for example by numerals of 0 to 255, and also can be expressed by percentage of 0 to 100%, and numerals of 0 to 255 can also be expressed by hexadecimal notation.

In the example shown in FIG. 7, the color information is expressed by the values of 0 to 255, and the emotional parameter of the esthetic sense information towards a certain program has the color information of red 180, green 227, and blue 157, and the emotional parameter of the interpersonal emotion information has the color information of red 150, green 194, and blue 234. Similarly other emotional parameter also has the color information respectively.

Figure 8:
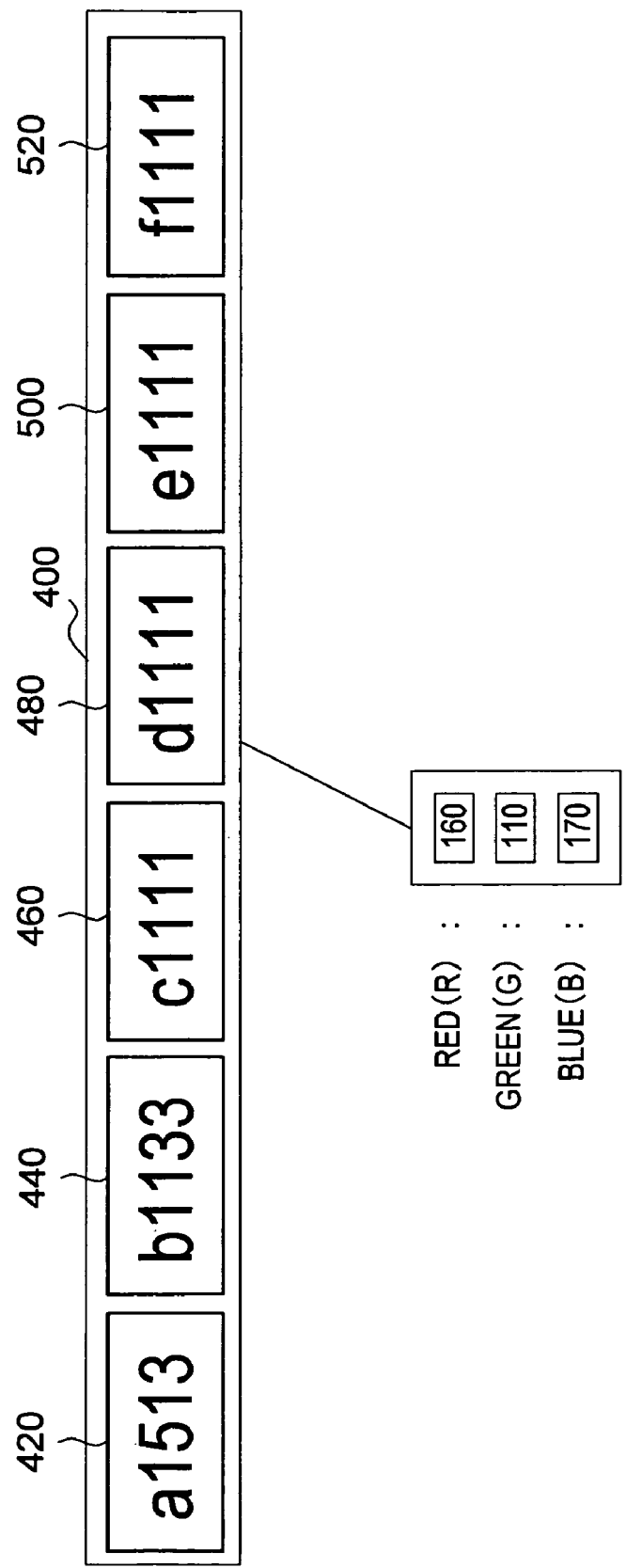
FIG. 8 is an explanatory view illustrating an example of managing the EID according to this embodiment, by utilizing the color information.

As a result, by integrating the plurality of color information, the EID 400 has one piece of color information. In the example shown in FIG. 8, the EID 400 has the color information of red 160, green 110, and blue 170. Note that each value of the color information shown in FIG. 7 and FIG. 8 is an example for describing this embodiment, and the present invention is not limited thereto.

Thus, by creating/managing the EID 400 by using the color information, the processing in the ECG server 200 can be simplified. For example, even when the viewer EID 242 and the program EID 282 are compared as described above, they can be easily compared based on the color information of the EIDs 242 and 282. Further, based on the color information of the program EID 282 included in the ECG unit 222 received from the ECG server 200, the broadcast receiving terminal 300 can display the ECG information constituting this ECG unit 222 as a background color, when this ECG information is displayed. Thus, the viewer can empirically recognize what kind of emotion is expressed by the ECG information visually.

(Display of ECG Unit 222 in Broadcast Receiving Terminal 300)

Display of the ECG unit 222 in the broadcast receiving terminal 300 will be described hereunder, with reference to FIG. 9, when the ECG unit 222 is provided to the broadcast receiving terminal 300 by the ECG server 200 according to this embodiment.

Figure 9:
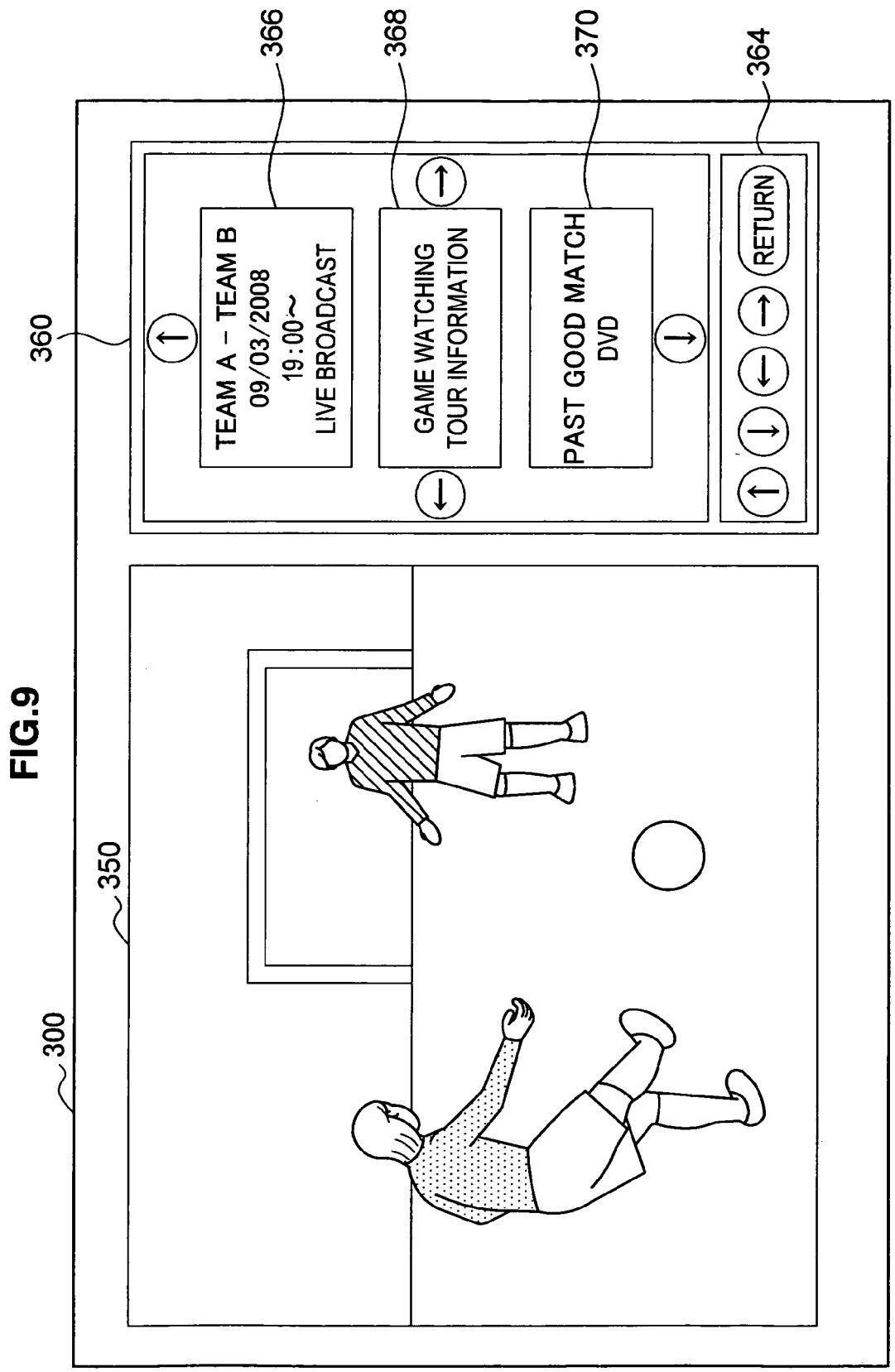
FIG. 9 is an explanatory view exemplifying a display of an ECG unit 222 in a broadcast receiving terminal 300 according to this embodiment.

FIG. 9 is an explanatory view exemplifying a display screen of the ECG unit 222 in the broadcast receiving terminal 300 according to this embodiment. By activating the ECG service of the broadcast receiving terminal 300, the viewer can browse the ECG unit 222 provided from the ECG server 200, per every unit of the ECG information. As described above, the ECG unit 222 includes the program information and the related information, etc.

In FIG. 9, a picture information display frame 350 and an ECG information display frame 360 of the broadcast receiving terminal 300 are displayed by two screens. Note that arrangement of the picture information frame 350 and the ECG information display frame 360 can be changed to inverse arrangement, vertical arrangement, and overlapped arrangement, and is not limited to the arrangement shown in the figure. The broadcast receiving terminal 300 displays picture information provided from the content provider 120 in the picture display frame 350, and displays the picture information of a soccer program, for example, in the example shown in FIG. 9.

The ECG information display frame 360 includes an ECG information display area 362 for displaying the ECG information, and an operation information display area 364 for displaying operation information. In FIG. 9, "↑", "↓", "→", "←" and "return" are displayed in the operation information display area 364 as selectable operation information. In addition, the ECG information display area 362 displays ECG information 366 regarding the program information of a relaying broadcast program of a soccer game, related information 368 regarding a tour to watch the soccer game, and related information 370 regarding a DVD of each of the past games of the soccer. Of course this is an example, and the present invention is not limited thereto, and for example various ECG information such as other program information, ticket information, player information, and team HP information can be displayed. In addition, as described above, when each EID includes the color information, a display controlling part 329 provided in the broadcast receiving terminal 300 can display the ECG information in the display part, with color based on the color information of the program EID 282 included in the acquired ECG unit 222 set as a background. Thus, the viewer can empirically recognize what kind of emotion is expressed by the ECG information visually.

In this display screen, for example, when a "↑" button and a "↓" button are operated by the viewer, the display of the ECG information display area 362 is vertically scrolled. When a "←" button and a "→" button are operated, the ECG information included in other ECG unit 222 provided from the ECG server 200 is displayed. Here, when a "return" button is operated by the viewer, one-preceding ECG information is displayed again.

(Processing Flow of ECG Server 200)

Figure 10:
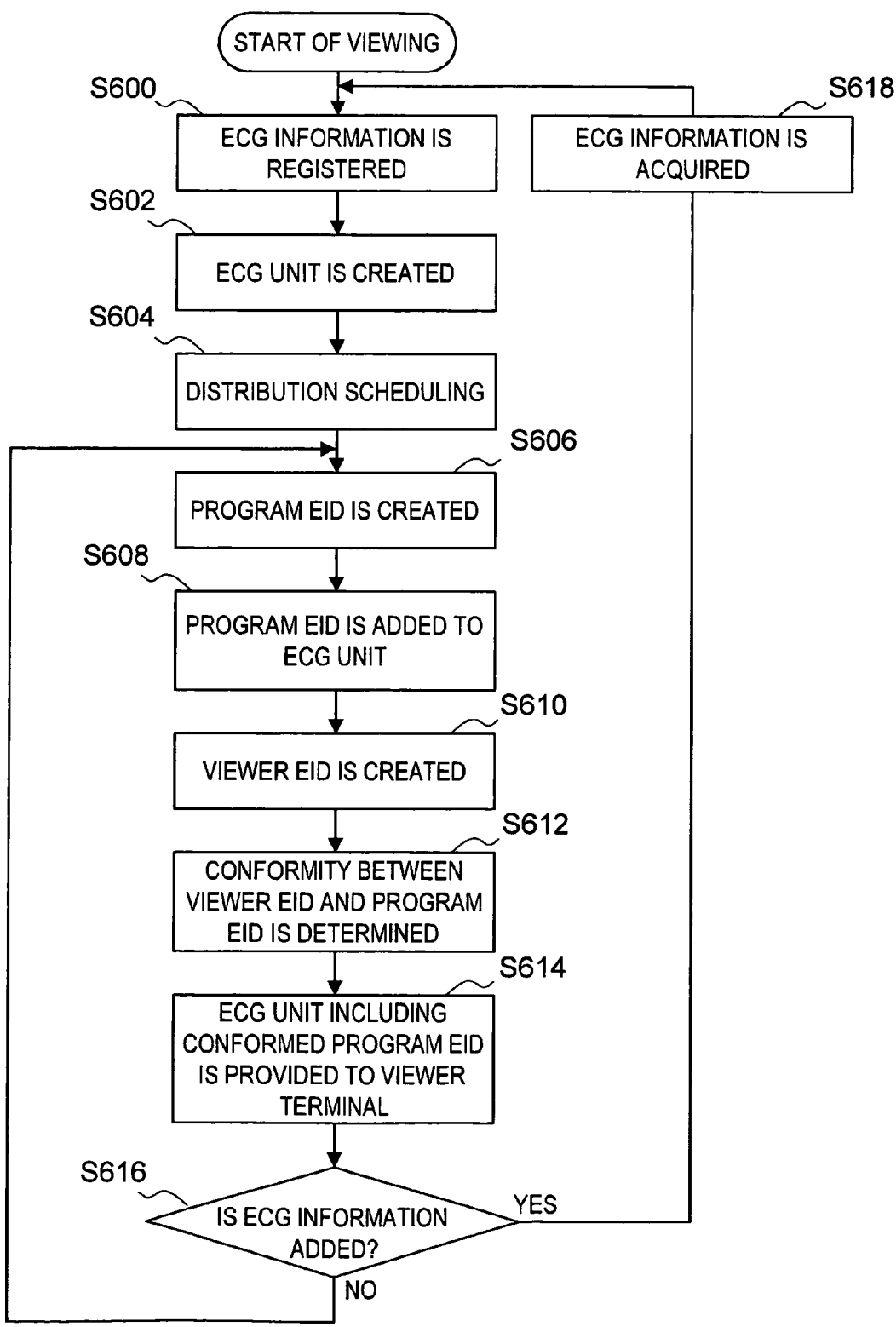
FIG. 10 is a flowchart illustrating a flow of providing information by an ECG server 200 according to this embodiment.
Figure 11:
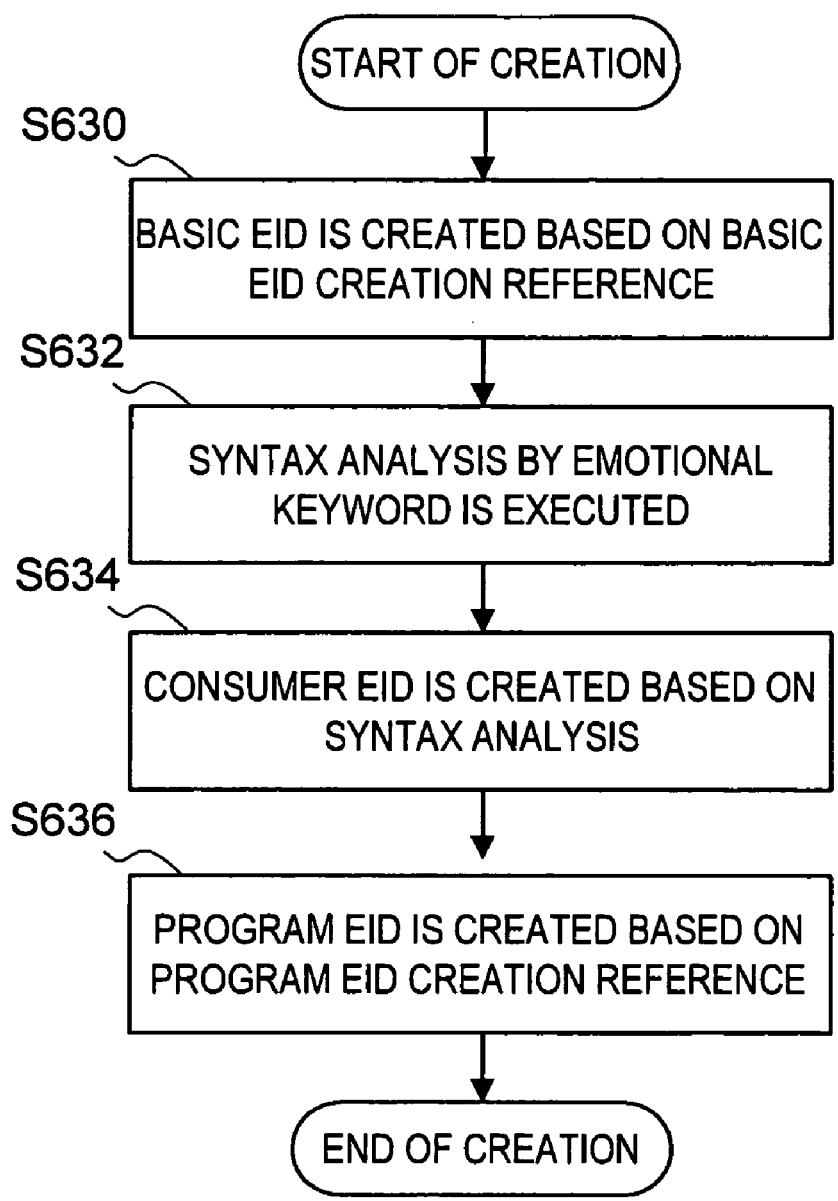
FIG. 11 is a flowchart regarding a creation of a program EID282 in a flowchart of FIG. 10.

A method of providing the ECG unit 222 to the broadcast receiving terminal 300 by the ECG management server 200 according to this embodiment will be described hereunder, with reference to FIG. 10 and FIG. 11. FIG. 10 illustrates a flowchart of an information providing method of the ECG management server 200 according to this embodiment.

The ECG registration system 210 registers the program information, etc, provided from the content provider 130 as the ECG information (step 600). For example, the program information, the organizing information, group information, supplementary information, etc, are provided from the content provider 120, and the ECG registration system 210 adds the identification information to these pieces of information, and adds the attribute information thereto expressing the contents of the program, and registers these pieces of information as the ECG information. Also, the ECG registration system 120 adds the attribute information expressing the contents of the program, to the related information such as the advertisement information and sales information regarding the program provided from the sponsor, and registers it as the ECG information.

The ECG management system 220 creates the ECG unit 222 by correlating the program information registered in the ECG registration system 210 and the ECG information expressing the related information (step 602). The ECG unit 222 is constituted of, for example, at least one ECG information regarding a certain program. For example, the ECG unit 222 is constituted of the program information regarding a certain specific program, and the related information such as character information, advertisement information, WEB information, and DVD information. As a result, the ECG management system 220 manages one or more ECG units 222 corresponding to each one of the one or more programs.

The ECG management system 220 creates a distribution schedule of the ECG unit 222, in accordance with, for example, the organizing schedule of the program, a program format, and a Cue sheet (step 604). Here, start/end dates of providing each program are set per every program unit, and the program is scheduled on a organizing schedule table. Meanwhile, the program is constituted of many program materials such as the material of a program main body, the material of a sponsor CM, and the material of a program advertisement. Then, start/end dates of providing the program are scheduled on the program format and Cue sheet per every unit of the material, and the program material thus scheduled is provided from the content provider 120 in accordance with a progress state of the program. Therefore, the ECG management system 220 distributes the ECG unit 222 regarding the program being provided at the time of providing the material of the program main body, and distributes the ECG unit 222 regarding the program being an advertisement object at the time of providing the material of the program advertisement, in accordance with a providing schedule of the program material. Therefore, the ECG management system 220 creates an ECG distribution schedule for each program.

The program EID processing system 280 of the ECG server 100 creates the program EID282 expressing the emotions estimated to be conceived by the viewer towards a certain specific program (step 606). FIG. 11 illustrates a flowchart of details regarding the creation of the program EID282 in step 606. The creation of the program EID282 will be described hereunder with reference to FIG. 11.

As described above, the program EID282 is created by combining the basic EID272 created based on the basic EID creation reference, and the consumer EID262 created based on a syntax analysis result of mouth of worth information and the consumer EID creation reference.

The basic EID processing system 270 creates the basic EID272 based on the basic EID creation reference set by the ECG service provider 120 (step 630). The basic EID creation reference is an index for estimating the emotion probably conceived by the viewer towards the program, based on various information regarding the program such as the past viewing record of the program (for example, viewing rate, frequency of changing channels, and an age group of the viewer) and the number of times of promotion/advertisement of the program. The ECG service provider 120 sets the emotional element regarding a certain specific program as this basic EID creation reference. At this time, the ECG service provider 120 can also particularly intensively set the emotional element desired to be conceived by the viewer towards this program, by reference to opinions of a producer and a specialist of the program. Thus, the ECG service provider 120 can positively recommend the program including the emotional element conceived by the viewer, which is so desired by the producer/provider/specialist of the program.

The basic EID272 is constituted of at least one emotional parameter including at least one emotional element as described above. In addition, at this time, as described above, the basic EID processing system 270 can also create the basic EID272 in a form having color information.

The consumer EID processing system 260 creates the consumer EID262 for constituting the program EID282, based on the information such as the opinion, impression, word of mouth, and evaluation of an unspecified viewer towards a certain specific program. The consumer EID processing system 260 performs, for example, syntax analysis (CGM analysis) of the information regarding the program written in the message board and the blog of the Internet (step 632). The consumer EID processing system 260 performs CGM analysis of the information written in the message board and the blog of the Internet, with a specific noun, adjective, adjective verb, etc, expressing a specific program name or emotional element set as a keyword. As a result, the consumer EID processing system 260 can recognize the number of writings of the keyword expressing the emotional element conceived by the viewer towards a certain specific program and characters, written into the message board and the blog by the unspecified viewer.

As described above, the consumer EID processing system 260 manages the consumer EID creation reference for creating the consumer EID262 from the aforementioned syntax analysis result. Here, the consumer EID creation reference is the index for determining the level of the emotional element based on a specific threshold value with the number of writings of the keyword expressing the emotional element towards a certain specific program set as a function.

The consumer EID processing system 260 creates the consumer EID262, based on a CGM analysis result and the consumer EID creation reference (step 634). As a result, the consumer EID262 can create the consumer EID262 expressing the emotion conceived by at least one unspecified viewer, towards a certain specific program and character. Note that as described above, the consumer EID processing system 260 can also create the consumer EID262 in the form having the color information.

The program EID processing system 280 creates the program EID282 expressing the emotional element estimated to be conceived by the viewer towards a certain specific program. As described above, the program EID280 according to this embodiment is created by combining the basic EID272 and the consumer EID262.

The program EID processing system 280 manages the program EID creation reference for combining the aforementioned basic EID272 and the consumer EID262. Here, the program EID creation reference is the index for combining the basic EID272 and the consumer EID262, arbitrarily created/updated by the ECG service provider 120. For example, this program EID creation reference can also be set so that an average value of the level of each emotional element constituting the basic EID272 and the level of each emotional element constituting the consumer EID262 is set as the level of each emotional element constituting the program EID282. Also, this program EID creation reference can be set so that weighting is put on the level of each emotional element constituting the basic EID272, and the level of each emotional element constituting the consumer EID262 at an arbitrary ratio, to obtain the level of each emotional element constituting the program EID282. The ECG service provider 120 can set the program EID creation reference so as to combine the basic EID272 and the consumer EID262 based on an arbitrary set reference as described above. Thus, for example, in a case of few words of mouths from the viewer toward a new program, or in the program particularly recommended by the program producer/provider/specialist, the weighting of the basic EID272 can be set large. Meanwhile, regarding the program picked up by the media, making headlines around the viewers, the weighting of the consumer EID262 can be set large.

Based on the aforementioned program EID creation reference, the program EID processing system 280 creates the program EID282, by combining the basic EID272 and the consumer EID262 (step 636).

In addition, as described above, by combining the color information of the basic EID272 and the color information of the consumer EID262, the program EID processing system 280 can create the program EID282 in the form having the color information. Also, according to this embodiment, the program EID282 is constituted by combining two of the basic EID272 and the consumer EID262. However, the present invention is not limited thereto. For example, the program IED282 can also be constituted only from the basic EID272. Similarly, the program EID282 can also be constituted only from the consumer EID262. Further, of course the program EID282 can also be constituted from three or more EIDs including other EID expressing the emotion regarding the program.

In FIG. 10 again, the ECG management system 220 adds to the ECG unit 222 created in step 602, the program EID282 created in step 606 for the program related to this ECG unit 222 (step 608). As a result, the ECG unit 222 regarding a certain specific program includes the program EID282 expressing the emotional element estimated to be conceived by the viewer towards this program, in addition to the program information regarding this program and the related information regarding the characters, etc. The ECG management system 220 manages the ECG unit 222 for each program as described above, and therefore adds to the ECG unit 222, the program EID282 for each program.

The viewer EID processing system 240 creates the viewer EID expressing the program preference of the viewer (step 610). The viewer EID processing system 240 receives from the receiving terminal apparatus 300, the viewing log 332 including the viewing record/browsing record of the viewer in the receiving terminal apparatus 300. The viewer EID processing system 240 creates the viewer EID242 based on the received viewing log 332 and the viewer EID creation reference.

Here, the viewer EID creation reference is the index for creating the viewer EID242 arbitrarily created/updated by the ECG service provider 120, and the viewer EID processing system 240 manages this viewer EID creation reference. The ECG service provider 120 can create/update the arbitrary viewer EID creation reference according to the viewing record of the viewer. Namely, the ECG service provider 120 can create/update the viewer EID creation reference, based on various information which can be acquired from the viewing log 332, such as a viewing time and viewing number of times of a certain specific program. For example, the viewer EID creation reference can also be set so as to create the viewer EID242 by simply averaging the program EID282 regarding the program viewed by the viewer. Also, for example, the viewer EID creation reference can be set so as to create the viewer EID242, based on the function of the viewing time and the viewing number of times of the program viewed by the viewer.

The viewer EID processing system 240 creates/manages the viewer EID242 by dividing the program preference of the viewer into arbitrary time zones and each day of a week. Accordingly, the viewer EID processing system 242 has, for example, the viewer EID expressing the program preference of the viewer in a certain specific time zone. Of course, the viewer EID processing system 242 can create/manage the viewer EID242 of all viewers, in which the ECG server 200 provides the ECG unit 222.

Note that as described above, the viewer EID processing system 240 can also create the viewer EID242 in the form having the color information. Also, according to this embodiment, the viewer EID processing system 240 receives the viewing log 332 from the broadcast receiving terminal 300, and creates the viewer EID242 based on this viewing log 332. However, the present invention is not limited thereto. For example, the broadcast receiving terminal 300 itself can create the viewer EID242 based on the viewing log 332, and the viewer EID processing system 240 can acquire the viewer EID242 created by this broadcast receiving terminal 300, via the communication network.

Thereafter, the EID conformity determination system 250 performs conformity determination for retrieving the ECG unit 222 having the program EID282 that conforms to the aforementioned viewer EID242 out of the ECG unit 222 managed by the ECG management system 220 (step 612). As the conformity determination, for example it is possible to retrieve the program EID282 having the level of the emotional element that completely coincides with the level of each emotional element of the viewer EID242, and for example, based on a specific threshold value, the program EID282 within a range of this threshold value can be retrieved. In addition, as described above, when the program EID282 and the viewer EID242 are created/managed in the form including the color information, the EID conformity determination system 250 can perform conformity determination with a value of each color parameter of red/green/blue constituting this color information set as a reference.

In step 612, the ECG unit 222 having the program EID282 that conforms to the viewer EID242 is provided to the broadcast receiving terminal 300 by the ECG providing/distributing system 230 via the communication network. At this time, the ECG providing/distributing system 230 acquires this ECG unit 222 from the ECG management system 220, in accordance with the ECG distribution schedule created in step 604, and provides it to the receiving terminal apparatus 300 via the communication network (step 614).

The broadcast receiving terminal 300 displays the ECG unit 222 provided from the ECG server 200. Thus, the viewer can select the program information, etc, that conforms to the self-program preference. In addition, the ECG unit 222 is selected based on the program preference of the viewer, and therefore it is possible to provide not only the program information limited to a specific category or character, but also various program information capable of satisfying the emotion of the viewer as the program preference. As a result, the viewer can select the program information capable of satisfying the emotion conceived in viewing the program without fail.

Even after the ECG unit 222 is provided to the broadcast receiving terminal 300 in step 614, the ECG registration system 210 regularly confirms existence/non-existence of addition of the program information or the related information from the content provider 130 and the sponsor 140 (step 616). When the program information, etc, is added, the ECG server 200 returns to step 600 and new ECG information is created based on the added information. Thus, based on the program information acquired from the content provider 130, the ECG server 200 can create/manage the ECG information and the ECG unit 222, as needed. As a result, the ECG server 200 can provide the newest ECG unit 222 to the broadcast receiving terminal 300 according to progression of the program. Similarly, the viewer can select the newest program information capable of satisfying the emotion conceived in viewing the program without fail.

In step 616, when the new program information is not added, the ECG server 200 returns to step 606.

The ECG service provider 120 can arbitrarily update the consumer EID creation reference for creating the consumer EID262 as described above, and the basic EID creation reference for creating the basic EID272. Accordingly, even when each reference of them is updated, the newest program EID282 can be created in step 606. In addition, for example, even when a lot of opinions, impressions, and a supporting message, etc, are written on the WEB from a large indefinite number of viewers towards a certain live program, the newest consumer EID262 can be created in step 634 by periodically performing the syntax analysis in step 632. Thus, when the basic EID272 and/or the consumer EID262 is changed, the program EID processing system 280 regularly updates the program EID282, based on the changed basic EID272 and the consumer EID262. Thus, the program EID282 can update the program EID282 in real time, regarding the live program also, such as a sports program or a music program. As a result, the broadcast receiving terminal 300 can acquired the ECG unit 222 on which the emotional information towards the contents of the program changing in real time is reflected. Namely, the viewer can select the program information, etc, capable of satisfying the emotion expressing the program preference in real time. For example, the ECG server 200 can provide the information of the program to the viewer having the program preference such as "exciting" or "impressing", when a tense scene appears in a certain live sports program.

Meanwhile, even when the program EID282 is not updated, the viewer EID processing system 240 regularly acquires the viewing log 332 from the broadcast receiving terminal 300. The viewer EID processing system 240 regularly updates the viewer EID242 including the emotional information expressing the program preference of the viewer of the broadcast receiving terminal 300 based on the acquired viewing log 332. Thus, the viewing record of the viewer that changes day by day can be regularly acquired, and the viewer EID242 accurately expressing the program preference of the viewer can be created/managed. As a result, the viewer can select various pieces of program information capable of satisfying the emotion of the viewer expressing the program preference that changes according to the time zone, each day of a week, and a season without fail.

As described above, the ECG server 200 according to this embodiment can provide to the broadcast receiving terminal 300, the ECG unit 222 that conforms to the program preference based on the emotion towards the program conceived by the viewer of the broadcast receiving terminal 300. In addition, the broadcast receiving terminal 300 according to this embodiment can acquired from the ECG server 200, the ECG unit 222 that conforms to the program preference based on the emotion towards the program conceived by the viewer. As a result, the viewer can select various contents information that conforms to the emotion conceived by the viewer in viewing the program, without being limited to a specific category, character, or channel, etc.

It should be understood by those skilled in the art that various modifications, combinations, sub-combinations and alterations may occur depending on design requirements and other factors insofar as they are within the scope of the appended claims or the equivalents thereof.

What is claimed is:

1. An information providing apparatus, which can be connected via a communication network to a broadcast receiving terminal that displays electronic contents guide (ECG) information including attribute information expressing contents of a program, comprising:
   an ECG information storage part that stores the ECG information;
   a viewer EID processing part that processes viewer emotional identification (EID) information as emotional information expressing a program preference of a viewer of the broadcast receiving terminal;
   a program EID processing part that processes program EID as emotional information corresponding to the contents of the program;
   an ECG unit constitution part that constitutes an ECG unit by correlating at least one of the ECG information with the program expressed by the attribute information, and correlates the program EID corresponding to this program with the ECG unit;
   an EID conformity determination part that determines one or more ECG units provided to the broadcast receiving terminal, based on the program EID correlated with the ECG unit and the viewer EID; and
   an ECG unit providing part that provides the determined one or more ECG units to the broadcast receiving terminal via the communication network,
   the program EID and viewer EID each specifying a plurality of emotional parameters, each emotional parameter specifying a plurality of emotional elements, and each emotional element being assigned a quantitative level,
   each emotional parameter is associated with parameter color information, each emotional element of the emotional parameter is associated with element color information, and the parameter color information for an emotional parameter is obtained by combining the element color information of the emotional elements corresponding to the emotional parameter,
   wherein the element color information for each emotional element of an emotional parameter is in the form of values of brightness for each one of the three primary colors of red, green, and blue, the parameter color information for an emotional parameter is in the form of values of brightness for each one of the three primary colors of red, green, and blue, and the parameter color information for an emotional parameter is obtained by combining, for the emotional elements corresponding to the emotional parameter, the values of brightness for each one of the three primary colors of red, green, and blue.

2. The information providing apparatus according to claim 1, wherein the viewer EID processing part includes a viewer EID acquisition part that acquires the viewer EID created by the broadcast receiving terminal.

3. The information providing apparatus according to claim 1, wherein the viewer EID processing part includes a viewer EID creation part that creates the viewer EID.

4. The information providing apparatus according to claim 3, wherein the viewer EID processing part includes a viewing log acquisition part that acquires from the broadcast receiving terminal, a viewing log including a viewing record stored in the broadcast receiving terminal, and the viewer EID creation part creates the viewer EID based on the viewing log.

5. The information providing apparatus according to claim 1, wherein the program EID is a basic EID created based on emotional information set by a provider of the ECG information according to contents of the program.

6. The information providing apparatus according to claim 1, wherein the program EID is a consumer EID created based on emotional information expressing an emotion of an unspecified viewer towards contents of the program.

7. The information providing apparatus according to claim 1, wherein the program EID is created by combining a basic EID created based on emotional information set by a provider of the ECG information according to contents of the program, and a consumer EID created based on emotional information expressing an emotion of an unspecified viewer towards contents of the program.

8. The information providing apparatus according to claim 6 or 7, wherein the ECG unit constitution part ranks a plurality of ECG units displayed in the broadcast receiving terminal, by correlating evaluation information expressing evaluation given by an unspecified viewer towards the program with the ECG unit.

9. The information providing apparatus according to claim 1, wherein the viewer EID and the program EID include color information corresponding to the emotional information.

10. A broadcast receiving terminal, which can be connected via a communication network to an information providing apparatus constituting an ECG unit including at least one piece of electronic contents guide (ECG) information correlated to a program, and a program EID (emotional identification) as emotional information corresponding to contents of the program, comprising:
   a viewing log processing part that processes a viewing log including a viewing record stored in the broadcast receiving terminal, for creating viewer emotional identification (EID) information as emotional information expressing a program preference of a viewer;
   an ECG unit acquisition part that acquires from the information providing apparatus, the ECG unit including the program EID that conforms to the viewing EID, out of one or more aforementioned ECG units constituted by the information providing apparatus, via the communication network; and a display controlling part that controls display of the ECG unit, the program EID and viewer EID each specifying a plurality of emotional parameters, each emotional parameter specifying a plurality of emotional elements, and each emotional element being assigned a quantitative level, each emotional parameter is associated with parameter color information, each emotional element of the emotional parameter is associated with element color information, and the parameter color information for an emotional parameter is obtained by combining the element color information of the emotional elements corresponding to the emotional parameter, wherein the element color information for each emotional element of an emotional parameter is in the form of values of brightness for each one of the three primary colors of red, green, and blue, the parameter color information for an emotional parameter is in the form of values of brightness for each one of the three primary colors of red, green, and blue, and the parameter color information for an emotional parameter is obtained by combining, for the emotional elements corresponding to the emotional parameter, the values of brightness for each one of the three primary colors of red, green, and blue.

11. The broadcast receiving terminal according to claim 10, wherein the viewing log processing part includes a viewing log transmission part that transmits the viewing log to the information providing apparatus via the communication network.

12. The broadcast receiving terminal according to claim 10, wherein the viewing log processing part includes a viewer EID creation part that creates the viewer EID based on the viewing log, and a viewer EID transmission part that transmits the created viewer EID to the information providing apparatus via the communication network.

13. The broadcast receiving terminal according to claim 10, wherein the viewer EID and the program EID include color information corresponding to the emotional information, and the display controlling part controls the ECG information constituting the ECG unit so as to be displayed in the broadcast receiving terminal with a color corresponding the color information set as a background.

14. An information providing system, including an information providing apparatus that provides electronic contents guide (ECG) information regarding a program, and a broadcast receiving terminal that can be connected to the information providing apparatus via a communication network, so that picture information and the ECG information of the program are acquired and displayed, the information providing apparatus comprising:
an ECG information storage part that stores the ECG information including attribute information expressing contents of the program;
a viewer EID processing part that processes viewer emotional identification (EID) information as emotional information expressing a program preference of a viewer of the broadcast receiving terminal;
a program EID processing part that creates a program EID as emotional information corresponding to the contents of the program;
an ECG unit constitution part that constitutes an ECG unit by correlating at least one of the ECG information with the program based on the attribute information, and correlates the program EID regarding the program to the ECT unit;
an EID conformity determination part that determines one or more ECG units provided to the broadcast receiving terminal, based on the program EID correlated to the ECG unit and the viewer EID; and
an ECG unit providing part that provides the determined one or more ECG units to the broadcast receiving terminal via the communication network, and the broadcast receiving terminal including:
a viewing log processing part that processes a viewing log including a viewing record stored in the broadcast receiving terminal, for creating the viewer EID;
an ECG unit acquisition part that acquires the ECG unit from the information providing apparatus via the communication network; and
a display controlling part that controls a display of the ECG unit, the program EID and viewer EID each specifying a plurality of emotional parameters, each emotional parameter specifying a plurality of emotional elements, and each emotional element being assigned a quantitative level, each emotional parameter is associated with parameter color information, each emotional element of the emotional parameter is associated with element color information, and the parameter color information for an emotional parameter is obtained by combining the element color information of the emotional elements corresponding to the emotional parameter, wherein the element color information for each emotional element of an emotional parameter is in the form of values of brightness for each one of the three primary colors of red, green, and blue, the parameter color information for an emotional parameter is in the form of values of brightness for each one of the three primary colors of red, green, and blue, and the parameter color information for an emotional parameter is obtained by combining, for the emotional elements corresponding to the emotional parameter, the values of brightness for each one of the three primary colors of red, green, and blue.

15. An information providing method, for providing information via a communication network, to a broadcast receiving terminal that displays electronic contents guide (ECG) information including attribute information expressing contents of a program, comprising the steps of:
storing ECG information;
processing viewer emotional identification (EID) information as emotional information expressing a program preference of viewer of the broadcast receiving terminal;
creating a program EID for processing a program EID as emotional information corresponding to contents of the program;
constituting an ECG unit by correlating at least one of the ECG information to the program based on the attribute information, and correlating the program EID corresponding to the program with the ECG unit;
determining EID conformity for determining one or more ECG units provided to the broadcast receiving terminal, based on the program EID correlated to the ECG unit and the viewer EID; and
providing the ECG unit for providing the determined one or more ECG units to the broadcast receiving terminal via the communication network, the program EID and viewer EID each specifying a plurality of emotional parameters, each emotional parameter specifying a plurality of emotional elements, and each emotional element being assigned a quantitative level, each emotional parameter is associated with parameter color information, each emotional element of the emotional parameter is associated with element color information, and the parameter color information for an emotional parameter is obtained by combining the element color information of the emotional elements corresponding to the emotional parameter, wherein the element color information for each emotional element of an emotional parameter is in the form of values of brightness for each one of the three primary colors of red, green, and blue, the parameter color information for an emotional parameter is in the form of values of brightness for each one of the three primary colors of red, green, and blue, and the parameter color information for an emotional parameter is obtained by combining, for the emotional elements corresponding to the emotional parameter, the values of brightness for each one of the three primary colors of red, green, and blue.

16. A non-transitory computer-readable medium storing a computer-readable program applied to an information providing apparatus that can be connected via a communication network, to a broadcast receiving terminal that displays an electronic contents guide (ECG) information including attribute information expressing contents of a program, for making a computer function as:

an ECG information storage section that stores the ECG information;
a viewer EID processing section that processes viewer emotional identification (EID) information as emotional information expressing a program preference of a viewer of the broadcast receiving terminal;
a program EID processing section that processes a program EID as emotional information corresponding to contents of the program;
an ECG unit constituting section that constitutes an ECG unit by correlating at least one of the ECG information to the program based on the attribute information, and correlates the program EID corresponding to the program with the ECG unit;
an EID conformity determination section that determines one or more ECG units provided to the broadcast receiving terminal, based on the program EID correlated to the ECG unit and the viewer EID; and
an ECG unit providing section that provides the determined one or more ECG units to the broadcast receiving terminal, via the communication network,
the program EID and viewer EID each specifying a plurality of emotional parameters, each emotional parameter specifying a plurality of emotional elements, and each emotional element being assigned a quantitative level,
each emotional parameter is associated with parameter color information, each emotional element of the emotional parameter is associated with element color information, and the parameter color information for an emotional parameter is obtained by combining the element color information of the emotional elements corresponding to the emotional parameter, wherein the element color information for each emotional element of an emotional parameter is in the form of values of brightness for each one of the three primary colors of red, green, and blue, the parameter color information for an emotional parameter is in the form of values of brightness for each one of the three primary colors of red, green, and blue, and the parameter color information for an emotional parameter is obtained by combining, for the emotional elements corresponding to the emotional parameter, the values of brightness for each one of the three primary colors of red, green, and blue.

17. A non-transitory computer-readable medium storing a computer-readable program applied in a broadcast receiving terminal that can be connected via a communication network, to an information providing apparatus constituting an ECG unit including at least one electronic contents guide (ECG) information correlated with a program, and a program emotional identification (EID) as emotional information corresponding to contents of the program, for making a computer function as:

a viewing log processing section that processes a viewing log including a viewing record stored in the broadcast receiving terminal, for creating viewer emotional identification (EID) information as emotional information expressing a program preference of a viewer;
an ECG unit acquiring section that acquires the ECG unit including the program EID that conforms to the viewer EID, out of one or more ECG units constituted by the information providing apparatus, from the information providing apparatus via the communication network; and
a display controlling part that controls a display of the ECG unit,
the program EID and viewer EID each specifying a plurality of emotional parameters, each emotional parameter specifying a plurality of emotional elements, and each emotional element being assigned a quantitative level,
each emotional parameter is associated with parameter color information, each emotional element of the emotional parameter is associated with element color information, and the parameter color information for an emotional parameter is obtained by combining the element color information of the emotional elements corresponding to the emotional parameter, wherein the element color information for each emotional element of an emotional parameter is in the form of values of brightness for each one of the three primary colors of red, green, and blue, the parameter color information for an emotional parameter is in the form of values of brightness for each one of the three primary colors of red, green, and blue, and the parameter color information for an emotional parameter is obtained by combining, for the emotional elements corresponding to the emotional parameter, the values of brightness for each one of the three primary colors of red, green, and blue.

\* \* \* \* \*